United States Patent
Usoro et al.

(10) Patent No.: US 6,689,010 B2
(45) Date of Patent: Feb. 10, 2004

(54) MULTI-SPEED PLANETARY TRANSMISSIONS WITH CLUTCHED INPUT AND THREE PLANETARY GEARSETS

(75) Inventors: Patrick Benedict Usoro, Troy, MI (US); Norman Kenneth Bucknor, Troy, MI (US); Chunhao J. Lee, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/133,143

(22) Filed: Apr. 26, 2002

(65) Prior Publication Data

US 2003/0203787 A1 Oct. 30, 2003

(51) Int. Cl.$^7$ ................................. F16H 3/66
(52) U.S. Cl. ........................ 475/296; 475/275
(58) Field of Search .................. 475/269, 275, 475/282, 296, 317

(56) References Cited

U.S. PATENT DOCUMENTS

| | | | |
|---|---|---|---|
| 4,070,927 A | 1/1978 | Polak | 74/765 |
| 5,090,952 A * | 2/1992 | Asada | 475/278 |
| 5,106,352 A | 4/1992 | Lepelletier | 475/753 |
| 5,599,251 A | 2/1997 | Beim et al. | 475/275 |
| 6,071,208 A | 6/2000 | Koivunen | 475/275 |
| 6,083,135 A | 7/2000 | Baldwin et al. | 475/276 |
| 6,217,474 B1 * | 4/2001 | Ross et al. | 475/269 |

FOREIGN PATENT DOCUMENTS

| | | | |
|---|---|---|---|
| EP | 1033510 | | 6/2000 |
| JP | 2-154840 A | * | 6/1990 |

* cited by examiner

Primary Examiner—Ankur Parekh
(74) Attorney, Agent, or Firm—Kathryn A. Marra

(57) ABSTRACT

A family of power transmissions includes three planetary gearsets, each of which has three members, and six torque-transmitting mechanisms, which are selectively engageable to establish at least seven forward speed ratios and one reverse speed ratio between a transmission input shaft and a transmission output shaft. Each of the family members has a first member of the first planetary gearset continuously interconnected with a first member of the second planetary gearset, a second member of the second planetary gearset continuously interconnected with a first member of the third planetary gearset, and a second member of the first planetary gearset continuously interconnected with either a third member of the second planetary gearset or a second member of the third planetary gearset. One member of the first planetary gearset is continuously interconnected with a transmission housing, and a transmission output shaft is continuously interconnected with at least one member of one the planetary gearsets.

5 Claims, 12 Drawing Sheets

| | RATIOS | 50 | 52 | 54 | 56 | 58 | 60 |
|---|---|---|---|---|---|---|---|
| REVERSE | -1.51 | | | X | | | X |
| NEUTRAL | | | | X | | | |
| 1 | 3.48 | | | X | X | | |
| 2 | 1.99 | | X | | X | | |
| 3 | 1.00 | X | | | X | | |
| 4 | 0.82 | | X | | | X | |
| 5 | 0.56 | | | X | | X | |
| 6 | 0.41 | X | | | | X | |
| 7 | 0.38 | X | | X | | | |

( X=engaged )

Ring Gear/Sun Gear Tooth Ratios: $\frac{R1}{S1}=2.92, \frac{R2}{S2}=1.89, \frac{R3}{S3}=1.51$

| Ratio Spread | 9.20 |
|---|---|
| Ratio Steps | |
| REV/1 | -0.43 |
| 1/2 | 1.75 |
| 2/3 | 1.99 |
| 3/4 | 1.22 |
| 4/5 | 1.48 |
| 5/6 | 1.34 |
| 6/7 | 1.09 |

| | RATIOS | 150 | 152 | 154 | 156 | 158 | 160 |
|---|---|---|---|---|---|---|---|
| REVERSE | -1.51 | | | X | | X | |
| NEUTRAL | | | | X | | | |
| 1 | 3.48 | | | X | X | | |
| 2 | 1.99 | | X | | X | | |
| 3 | 1.00 | X | | | X | | |
| 4 | 0.82 | | X | | | | X |
| 5 | 0.56 | | | X | | | X |
| 6 | 0.41 | X | | | | | X |
| 7 | 0.38 | X | | X | | | |

(X=engaged)

Ring Gear/Sun Gear Tooth Ratios: $\frac{R1}{S1}=2.92, \frac{R2}{S2}=1.89, \frac{R3}{S3}=1.51$

| Ratio Spread | 9.20 |
|---|---|
| Ratio Steps | |
| REV/1 | -0.43 |
| 1/2 | 1.75 |
| 2/3 | 1.99 |
| 3/4 | 1.22 |
| 4/5 | 1.48 |
| 5/6 | 1.34 |
| 6/7 | 1.09 |

| | RATIOS | 250 | 252 | 254 | 256 | 258 | 260 |
|---|---|---|---|---|---|---|---|
| REVERSE | -0.95 | | X | X | | | |
| NEUTRAL | | | X | | | | |
| 1 | 2.19 | | X | | | X | |
| 2 | 1.42 | | X | | X | | |
| 3 | 1.00 | | X | | | | X |
| 4 | 0.67 | X | X | | | | |
| 5 | 0.61 | X | | | | | X |
| 6 | 0.52 | X | | | X | | |
| 7 | 0.37 | X | | | | X | |

(X=engaged)

Ring Gear/Sun Gear Tooth Ratios: $\frac{R1}{S1}=1.74, \frac{R2}{S2}=1.67, \frac{R3}{S3}=2.99$

| Ratio Spread | 5.99 |
|---|---|
| Ratio Steps | |
| REV/1 | -0.43 |
| 1/2 | 1.54 |
| 2/3 | 1.42 |
| 3/4 | 1.49 |
| 4/5 | 1.11 |
| 5/6 | 1.16 |
| 6/7 | 1.42 |

| | RATIOS | 350 | 352 | 354 | 356 | 358 | 360 |
|---|---|---|---|---|---|---|---|
| REVERSE | -2.68 | | X | | | X | |
| NEUTRAL | | | X | | | | |
| 1 | 2.18 | | X | X | | | |
| 2 | 1.47 | | X | | X | | |
| 3 | 1.00 | | X | | | | X |
| 4 | 0.69 | X | X | | | | |
| 5 | 0.62 | X | | | | | X |
| 6 | 0.51 | X | | | | X | |
| 7 | 0.35 | X | | X | | | |

(X=engaged)

Ring Gear/Sun Gear Tooth Ratios: $\frac{R1}{S1}=1.87, \frac{R2}{S2}=2.12, \frac{R3}{S3}=1.51$

| Ratio Spread | 6.27 |
|---|---|
| Ratio Steps | |
| REV/1 | -1.23 |
| 1/2 | 1.48 |
| 2/3 | 1.47 |
| 3/4 | 1.44 |
| 4/5 | 1.11 |
| 5/6 | 1.21 |
| 6/7 | 1.47 |

| | RATIOS | 450 | 452 | 454 | 456 | 458 | 460 |
|---|---|---|---|---|---|---|---|
| REVERSE | -3.48 | | X | | X | | |
| NEUTRAL | | | X | | | | |
| 1 | 2.32 | | X | X | | | |
| 2 | 1.47 | | X | | | | X |
| 3 | 1.00 | | X | | | X | |
| 4 | 0.67 | X | X | | | | |
| 5 | 0.60 | X | | | | X | |
| 6 | 0.51 | X | | | | | X |
| 7 | 0.35 | X | | X | | | |

(X=engaged)

Ring Gear/Sun Gear Tooth Ratios: $\frac{R1}{S1}=1.87, \frac{R2}{S2}=2.12, \frac{R3}{S3}=1.80$

| Ratio Spread | 6.66 |
|---|---|
| Ratio Steps | |
| REV/1 | -0.50 |
| 1/2 | 1.58 |
| 2/3 | 1.47 |
| 3/4 | 1.50 |
| 4/5 | 1.11 |
| 5/6 | 1.18 |
| 6/7 | 1.47 |

| | RATIOS | 550 | 552 | 554 | 556 | 558 | 560 |
|---|---|---|---|---|---|---|---|
| REVERSE | -1.04 | | X | | | X | |
| NEUTRAL | | | X | | | | |
| 1 | 2.32 | | X | X | | | |
| 2 | 1.47 | | X | | | X | |
| 3 | 1.00 | | X | | | | X |
| 4 | 0.67 | X | X | | | | |
| 5 | 0.60 | X | | | | | X |
| 6 | 0.51 | X | | | | X | |
| 7 | 0.35 | X | | X | | | |

(X=engaged)

Ring Gear/Sun Gear Tooth Ratios: $\frac{R1}{S1}=1.87, \frac{R2}{S2}=2.12, \frac{R3}{S3}=1.80$

| Ratio Spread | 6.66 |
|---|---|
| Ratio Steps | |
| REV/1 | -0.45 |
| 1/2 | 1.58 |
| 2/3 | 1.47 |
| 3/4 | 1.50 |
| 4/5 | 1.11 |
| 5/6 | 1.18 |
| 6/7 | 1.47 |

| RATIOS | | 650 | 652 | 654 | 656 | 658 | 660 |
|---|---|---|---|---|---|---|---|
| REVERSE | -1.20 | | X | | | X | |
| NEUTRAL | | | X | | | | |
| 1 | 2.16 | | X | X | | | |
| 2 | 1.41 | | X | | X | | |
| 3 | 1.00 | | X | | | | X |
| 4 | 0.64 | X | X | | | | |
| 5 | 0.57 | X | | | | | X |
| 6 | 0.49 | X | | | X | | |
| 7 | 0.35 | X | | X | | | |

(X=engaged)

Ring Gear/Sun Gear Tooth Ratios: $\frac{R1}{S1}=1.87, \frac{R2}{S2}=2.41, \frac{R3}{S3}=1.80$

| Ratio Spread | 6.20 |
|---|---|
| Ratio Steps | |
| REV/1 | -0.56 |
| 1/2 | 1.53 |
| 2/3 | 1.41 |
| 3/4 | 1.56 |
| 4/5 | 1.12 |
| 5/6 | 1.16 |
| 6/7 | 1.41 |

| | RATIOS | 750 | 752 | 754 | 756 | 758 | 760 |
|---|---|---|---|---|---|---|---|
| REVERSE | -1.30 | | X | | X | | |
| NEUTRAL | | | X | | | | |
| 1 | 2.53 | | X | X | | | |
| 2 | 1.55 | | X | | | | X |
| 3 | 1.00 | | X | | | X | |
| 4 | 0.65 | X | X | | | | |
| 5 | 0.59 | X | | | | X | |
| 6 | 0.49 | X | | | | | X |
| 7 | 0.32 | X | | X | | | |

( X = engaged )

Ring Gear/Sun Gear Tooth Ratios: $\frac{R1}{S1}=2.13, \frac{R2}{S2}=1.83, \frac{R3}{S3}\ 1.80$

| Ratio Spread | 7.91 |
|---|---|
| Ratio Steps | |
| REV/1 | -0.51 |
| 1/2 | 1.64 |
| 2/3 | 1.55 |
| 3/4 | 1.53 |
| 4/5 | 1.10 |
| 5/6 | 1.20 |
| 6/7 | 1.55 |

| | RATIOS | 850 | 852 | 854 | 856 | 858 | 860 |
|---|---|---|---|---|---|---|---|
| REVERSE | -2.94 | X | | | | | X |
| NEUTRAL | | X | | | | | |
| 1 | 3.15 | X | | | | X | |
| 2 | 2.03 | | X | | | X | |
| 3 | 1.55 | | | X | | X | |
| 4 | 1.23 | | X | X | | | |
| 5 | 1.00 | X | | X | | | |
| 6 | 0.89 | | | X | X | | |
| 7 | 0.58 | X | | | X | | |
| 8 | 0.37 | | X | | X | | |

(X=engaged)

Ring Gear/Sun Gear Tooth Ratios: $\frac{R1}{S1} = 1.80, \frac{R2}{S2} = 1.83, \frac{R3}{S3} = 2.94$

| Ratio Spread | 8.50 |
|---|---|
| Ratio Steps | |
| REV/1 | -0.93 |
| 1/2 | 1.56 |
| 2/3 | 1.31 |
| 3/4 | 1.25 |
| 4/5 | 1.23 |
| 5/6 | 1.12 |
| 6/7 | 1.55 |
| 7/8 | 1.56 |

| | RATIOS | 950 | 952 | 954 | 956 | 958 | 960 |
|---|---|---|---|---|---|---|---|
| REVERSE | -2.94 | X | | | | X | |
| NEUTRAL | | X | | | | | |
| 1 | 3.15 | X | | | | | X |
| 2 | 2.03 | | X | | | | X |
| 3 | 1.55 | | | X | | | X |
| 4 | 1.23 | | X | X | | | |
| 5 | 1.00 | X | | X | | | |
| 6 | 0.89 | | | X | X | | |
| 7 | 0.58 | X | | | X | | |
| 8 | 0.37 | | X | | X | | |

( X=engaged )

Ring Gear/Sun Gear Tooth Ratios: $\frac{R1}{S1}=1.80, \frac{R2}{S2}=1.83, \frac{R3}{S3}=2.94$

| Ratio Spread | 8.50 |
|---|---|
| Ratio Steps | |
| REV/1 | -0.93 |
| 1/2 | 2.56 |
| 2/3 | 1.31 |
| 3/4 | 1.25 |
| 4/5 | 1.23 |
| 5/6 | 1.12 |
| 6/7 | 1.55 |
| 7/8 | 1.56 |

| | RATIOS | 1050 | 1052 | 1054 | 1056 | 1058 | 1060 |
|---|---|---|---|---|---|---|---|
| REVERSE | -3.26 | | | X | | X | |
| NEUTRAL | | | | | | X | |
| 1 | 4.60 | X | | | | X | |
| 2 | 3.13 | X | | | X | | |
| 3 | 1.78 | X | | | | | X |
| 4 | 1.47 | X | | X | | | |
| 5 | 1.00 | | | X | | | X |
| 6 | 0.65 | | X | X | | | |
| 7 | 0.57 | | X | | | | X |

( X=engaged )

Ring Gear/Sun Gear Tooth Ratios: $\frac{R1}{S1}=2.13, \frac{R2}{S2}=2.12, \frac{R3}{S3}=1.51$

| Ratio Spread | 8.07 |
|---|---|
| Ratio Steps | |
| REV/1 | -0.71 |
| 1/2 | 1.47 |
| 2/3 | 1.75 |
| 3/4 | 1.21 |
| 4/5 | 1.47 |
| 5/6 | 1.55 |
| 6/7 | 1.13 |

| | RATIOS | 1150 | 1152 | 1154 | 1156 | 1158 | 1160 |
|---|---|---|---|---|---|---|---|
| REVERSE | -0.95 | | X | X | | | |
| NEUTRAL | | | X | | | | |
| 1 | 2.19 | | X | | | X | |
| 2 | 1.42 | | X | | X | | |
| 3 | 1.00 | | X | | | | X |
| 4 | 0.67 | X | X | | | | |
| 5 | 0.61 | X | | | | | X |
| 6 | 0.52 | X | | | X | | |
| 7 | 0.37 | X | | | | X | |

( X=engaged )

Ring Gear/Sun Gear Tooth Ratios: $\frac{R1}{S1}=1.74, \frac{R2}{S2}=2.67, \frac{R3}{S3}=2.99$

| Ratio Spread | 5.99 |
|---|---|
| Ratio Steps | |
| REV/1 | -0.43 |
| 1/2 | 1.54 |
| 2/3 | 1.42 |
| 3/4 | 1.49 |
| 4/5 | 1.11 |
| 5/6 | 1.16 |
| 6/7 | 1.42 |

MULTI-SPEED PLANETARY TRANSMISSIONS WITH CLUTCHED INPUT AND THREE PLANETARY GEARSETS

TECHNICAL FIELD

This invention relates to power transmissions and, more particularly, to power transmissions having three planetary gearsets and providing at least seven forward speed ratios.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission. However, seven-speed power transmissions have not been proposed due to the complexity of these assemblies, as well as size and cost.

SUMMARY OF THE INVENTION

It is an object of the present invention to provide an improved low-content power transmission having at least seven forward speed ratios derived from three planetary gearsets.

In one aspect of the present invention, each transmission has three planetary gearsets and each planetary gearset has three planetary members.

In another aspect of the present invention, the planetary members are comprised of a sun gear member, a ring gear member, and a planet carrier assembly member.

In still another aspect of the present invention, a first member of the first and second planetary members are interconnected.

In yet another aspect of the present invention, the second member of the second planetary gearset and the first member of the third planetary gearset are continuously interconnected by an interconnecting member.

In a yet still another aspect of the present invention, the second member of the first planetary gearset is continuously interconnected with either a third member of the second planetary gearset or a second member of the third planetary gearset.

In yet still another aspect of the present invention, a member of the first planetary gearset is continuously interconnected with a transmission housing.

In still another aspect of the present invention, a transmission output shaft is continuously interconnected with at least one member of one of the planetary gearsets.

In yet another aspect of the present invention, the input shaft is not continuously interconnected with any member of the planetary gearsets.

In a further aspect of the present invention, six selectively engageable torque-transmitting mechanisms are engaged in combinations of two to establish at least seven forward speed ratios and one reverse speed ratio within the transmission.

In a yet further aspect of the present invention, a first of the torque-transmitting mechanisms interconnects a transmission input shaft with at least one member of one of the planetary gearsets.

In yet a further aspect of the present invention, a second of the torque-transmitting mechanisms selectively interconnects the input shaft with another member of the first or third planetary gearset or with one of the interconnected members.

In still a further aspect of the present invention, a third of the torque-transmitting mechanisms selectively interconnects a member of one of the planetary gearsets with at least another member of the planetary gearsets or with the input shaft or with the output shaft.

In a yet still further aspect of the present invention, a fourth of the torque-transmitting mechanisms selectively interconnects a member of one of the three planetary gearsets with either the input shaft, the output shaft, or another member of one of the planetary gearsets.

In another aspect of the present invention, a fifth of the torque-transmitting mechanisms selectively interconnects a member of one of the three planetary gearsets or one of the fixed interconnections with another member of one of the three planetary gearsets.

In a further aspect of the present invention, a sixth of the torque-transmitting mechanisms connects a member of one of the planetary gearsets with either the output shaft, another member of one of the planetary gearsets, or with the transmission housing.

DESCRIPTION OF THE EXEMPLARY EMBODIMENT

Figures 1, 2:
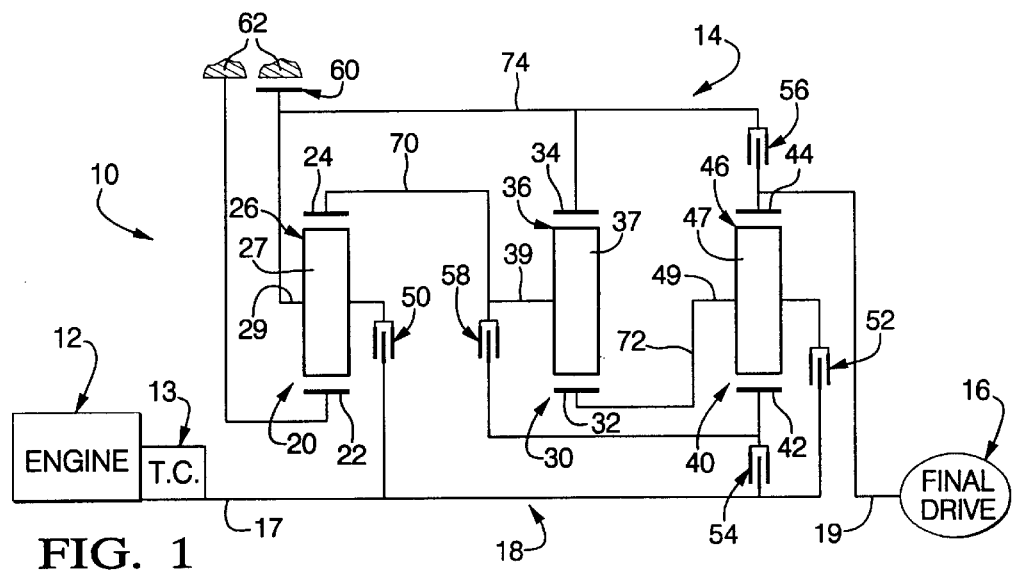
FIG. 1 is a schematic representation of a powertrain having a planetary transmission incorporating one embodiment of the present invention.
FIG. 2 is a truth table and chart providing some of the operating characteristics of the embodiment shown in FIG. 1.

Referring to the drawings, wherein like characters represent the same or corresponding parts throughout the several views, there is seen in FIG. 1 a powertrain 10 having a conventional engine or other prime mover 12, a conventional starting device 13, such as a torque converter, a planetary transmission 14, and a conventional final drive mechanism 16. As is well known, the final drive mechanism 16 generally incorporates a differential type gearing, which is adapted to drive the vehicle wheels, not shown, of a vehicle.

The planetary transmission 14 includes an input shaft 17, a planetary gear arrangement 18, and an output shaft 19. The planetary gear arrangement 18 includes three planetary gearsets 20, 30, and 40, five rotating type torque-transmitting mechanisms 50, 52, 54, 56, and 58, and one stationary type torque-transmitting mechanism 60. The rotating type torque-transmitting mechanisms are conventional fluid-operated multi-plate friction devices, generally termed clutches, and the stationary type torque-transmitting mechanism is a conventional fluid-operated friction type device, commonly termed a brake. The stationary torque-transmitting mechanism may be either of the disc type or band type.

The planetary gearset 20 includes a sun gear member 22, a ring gear member 24, and a planet carrier assembly member 26. The planet carrier assembly member 26 includes a plurality of pinion gear members 27 rotatably mounted on a planet carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gear members 37 rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gear members 47 rotatably mounted on a planet carrier member 49 and disposed in meshing relationship with both the sun gear member 42 and the ring gear member 44.

The planetary gearsets 20, 30, and 40 are all of the simple planetary type, which means that there is only a single meshing pinion between the sun gear member and the ring gear member. Each of the planetary gearsets includes three or more of the pinion gear members, which are rotatably mounted on their respective carriers and disposed substantially equiangularly about the sun gear and the ring gear. The number of pinion gear members incorporated within each planetary gearset is generally determined by the maximum torque-carrying requirement of the planetary gearset. During the description of the various embodiments of this invention, the planet carrier assembly member will be referred to as the mechanism that is being operated.

The ring gear member 24 is continuously interconnected with the planet carrier assembly member 36 through an interconnecting member 70. The sun gear member 32 is continuously interconnected with the planet carrier assembly member 46 through an interconnecting member 72. The planet carrier assembly member 26 is continuously interconnected with the ring gear member 34 through an interconnecting member 74. The sun gear member 22 is continuously interconnected with a transmission housing 62. The transmission housing 62 represents elements within the transmission that are stationary relative to the rotation of the input shaft and the output shaft. The ring gear member 44 is continuously interconnected with the output shaft 19.

The input shaft 17 is selectively interconnectible with the interconnecting member 74 through the torque-transmitting mechanism 50, selectively interconnectible with the interconnecting member 72 through the torque-transmitting mechanism 52, and selectively interconnectible with the sun gear member 42 through the torque-transmitting mechanism 54. The interconnecting member 74 is selectively interconnectible with the output shaft 19 through the torque-transmitting mechanism 56. The sun gear member 42 is selectively interconnectible with the interconnecting member 70 through the torque-transmitting mechanism 58. The interconnecting member 74 is selectively interconnectible with the transmission housing through the torque-transmitting mechanism 60.

The torque-transmitting mechanisms are engaged in combinations of two, as seen in the truth table of FIG. 2, to establish a reverse speed ratio and seven forward speed ratios between the input shaft 17 and the output shaft 19. The engagement and disengagement of the torque-transmitting mechanisms is accomplished through a conventional electro-hydraulic fluid control system, not shown. Also shown in the truth table of FIG. 2 is a numerical example of speed ratios that are available with the planetary gear arrangement 18 when the sequence or engagement combinations shown therein are employed. These numerical values are determined utilizing the ring gear/sun gear tooth ratios of the planetary gearsets 20, 30, and 40, which are given in FIG. 2 as R1/S1, R2/S2, and R3/S3, respectively. Also shown in FIG. 2 is a chart, which provides the numerical value for the ratio steps between adjacent forward speed ratios as well as between the reverse and first forward speed ratio. Other information given in the chart of FIG. 2 is the numerical value of the overall ratio spread of the forward speed ratios. These numerical values are determined from the sample numerical speed ratio values given in the truth table.

To establish the reverse speed ratio, the torque-transmitting mechanisms 54 and 60 are engaged. With this combination of engagements, the input shaft 17 is connected with the sun gear member 42 and the planet carrier assembly member 46 is essentially grounded through the planetary gearsets 20 and 30. During the reverse speed ratio, the ring gear member 44 and therefore output shaft 19 are rotated at a speed determined by the speed of the sun gear member 42 and the ring gear/sun gear tooth ratio of the planetary gearset 40. The numerical value of the reverse speed ratio is determined by the ring gear/sun gear tooth ratio of the planetary gearset 40.

To establish the first forward speed ratio, the torque-transmitting mechanisms 54 and 56 are engaged. During the first forward speed ratio, the planet carrier assembly member 46 and sun gear member 32 are rotated at a speed determined by the speed of the sun gear member 42, the speed of the ring gear member 44, and the ring gear/sun gear tooth ratio of the planetary gearset 40. The planet carrier assembly member 36 and ring gear member 24 are rotated at a speed determined by the speed of the sun gear member 32, the speed of the ring gear member 34, and the ring gear/sun gear tooth ratio of the planetary gearset 30. The planet carrier assembly member 26, ring gear member 34, ring gear member 44 and therefore output shaft 19 are rotated at a speed determined by the speed of the ring gear member 24 and the ring gear/sun gear tooth ratio of the planetary gearset 20. The numerical value of the first forward speed ratio is determined by the ring gear/sun gear tooth ratios of all three planetary gearsets 20, 30, and 40.

The second forward speed ratio is established with the engagement of the torque-transmitting mechanisms 52 and 56. During the second forward speed ratio, the planet carrier assembly member 36 and ring gear member 24 are rotated at a speed determined by the speed of the sun gear member 32, the speed of the ring gear member 34, and the ring gear/sun gear tooth ratio of the planetary gearset 30. The planet carrier assembly member 26, ring gear member 34, ring gear member 44 and therefore output shaft 19 are rotated at a speed determined by the speed of the ring gear member 24 and the ring gear/sun gear tooth ratio of the planetary gearset 20. The numerical value of the second forward speed ratio is determined by the ring gear/sun gear tooth ratios of the planetary gearsets 20 and 30.

The third forward speed ratio is established with the engagement of the torque-transmitting mechanisms 50 and 56. During the third forward speed ratio, the input shaft 17 and output shaft 19 are rotated at the same speed through the torque-transmitting mechanisms 50 and 56, such that the numerical value of the third forward speed ratio is one.

The fourth forward speed ratio is established with the engagement of the torque-transmitting mechanisms 52 and 58. During the fourth forward speed ratio, the ring gear member 34 and planet carrier assembly member 26 are rotated at a speed determined by the speed of the sun gear member 32, the speed of the planet carrier assembly member 36, and the ring gear/sun gear tooth ratio of the planetary gearset 30. The ring gear member 24, planet carrier assembly member 36, and sun gear member 42 are rotated at a speed determined by the speed of the planet carrier assembly member 26 and the ring gear/sun gear tooth ratio of the planetary gearset 20. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 54 and 58. During the fifth forward speed ratio, the planet carrier assembly member 26 and ring gear member 34 are rotated at a speed determined by the speed of the ring gear member 24 and the ring gear/sun gear tooth ratio of the planetary gearset 20. The sun gear member 32 and planet carrier assembly member 46 are rotated at a speed determined by the speed of the planet carrier assembly member 36, the speed of the ring gear member 34, and the ring gear/sun gear tooth ratio of the planetary gearset 30. The ring gear member 44 and therefore output shaft 19 are rotated at a speed determined by the speed of the sun gear member 42, the speed of the planet carrier assembly member 46, and the ring gear/sun gear tooth ratio of the planetary gearset 40. The numerical value of the fifth forward speed ratio is determined by the ring gear/sun gear tooth ratios of all three planetary gearsets 20, 30, and 40.

The sixth forward speed ratio is established with the engagement of the torque-transmitting mechanisms 50 and 58. During the sixth forward speed ratio, the ring gear member 24, planet carrier assembly member 36, and sun gear member 42 are rotated at a speed determined by the speed of the planet carrier assembly member 26 and the ring gear/sun gear tooth ratio of the planetary gearset 20. The sun gear member 32 and planet carrier assembly member 46 are rotated at a speed determined by the speed of the ring gear member 34, the speed of the planet carrier assembly member 36, and the ring gear/sun gear tooth ratio of the planetary gearset 30. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the sixth forward speed ratio is determined by the ring gear/sun gear tooth ratios of all three planetary gearsets 20, 30, and 40.

The seventh forward speed ratio is established with the engagement of the torque-transmitting mechanisms 50 and 54. During the seventh forward speed ratio, the ring gear member 24 and planet carrier assembly member 36 are rotated at a speed determined by the speed of the planet carrier assembly member 26 and the ring gear/sun gear tooth ratio of the planetary gearset 20. The sun gear member 32 and planet carrier assembly member 46 are rotated at a speed determined by the speed of the ring gear member 34, the speed of the planet carrier assembly member 36, and the ring gear/sun gear tooth ratio of the planetary gearset 30. The ring gear member 44 and therefore output shaft 19 are rotated at a speed determined by the speed of the sun gear member 42, the speed of the planet carrier assembly member 46, and ring gear/sun gear tooth ratio of the planetary gearset 40. The numerical value of the seventh forward speed ratio is determined by the ring gear/sun gear tooth ratios of all three planetary gearsets 20, 30, and 40.

Figures 3, 4:
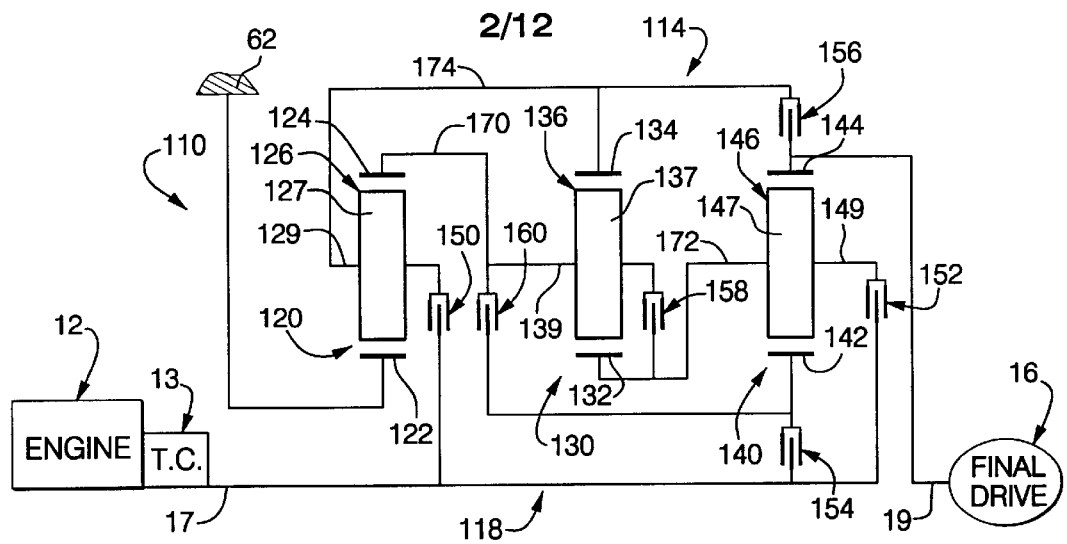
FIG. 3 is a schematic representation of a powertrain having a planetary transmission incorporating another embodiment of the present invention.
FIG. 4 is a truth table and chart providing some of the operating characteristics of the embodiment shown in FIG. 3.

A powertrain 110, shown in FIG. 3, includes the engine 12, the starting device 13, a planetary transmission 114, and the final drive mechanism 16. The planetary transmission 114 includes the input shaft 17, a planetary gear arrangement 118, and the output shaft 19. The planetary gear arrangement 118 includes three simple planetary gearsets 120, 130, and 140, and six rotating type torque-transmitting mechanisms 150, 152, 154, 156, 158, and 160.

The planetary gearset 120 includes a sun gear member 122, a ring gear member 124, and a planet carrier assembly member 126. The planet carrier assembly member 126 includes a plurality of pinion gear members 127 rotatably mounted on a planet carrier member 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gear members 137 rotatably mounted on a planet carrier member 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gear members 147 rotatably mounted on a planet carrier member 149 and disposed in meshing relationship with both the sun gear member 142 and the ring gear member 144.

The ring gear member 124 and planet carrier assembly member 136 are continuously interconnected by an interconnecting member 170. The sun gear member 132 and planet carrier assembly member 146 are continuously interconnected by an interconnecting member 172. The planet carrier assembly member 126 and ring gear member 134 are continuously interconnected by an interconnecting member 174. The sun gear member 122 is continuously interconnected with the transmission housing 62. The ring gear member 144 is continuously interconnected with the transmission output shaft 19.

The input shaft 17 is selectively interconnectible with the interconnecting member 174 through the torque-transmitting mechanism 150, selectively interconnectible with the interconnecting member 172 through the torque-transmitting mechanism 152, and selectively interconnectible with the sun gear member 142 through the torque-transmitting mechanism 154. The interconnecting member 174 is selectively interconnectible with the transmission output shaft 19 through the torque-transmitting mechanism 156. The interconnecting member 170 is selectively interconnectible with the interconnecting member 172 through the torque-transmitting mechanism 158. The sun gear member 142 is selectively interconnectible with the interconnecting member 170 through the torque-transmitting mechanism 160.

The torque-transmitting mechanisms are selectively engaged in combinations of two, as shown in the truth table of FIG. 4. Also shown in FIG. 4 is a numerical example of the speed ratios that are available with the transmission 114. These numerical examples are determined utilizing the ring gear/sun gear tooth ratios shown as R1/S1, R2/S2, and R3/S3, which represent the ring gear/sun gear tooth ratios of the planetary gearsets 120, 130, and 140, respectively. A chart in FIG. 4 provides a numerical example of the ratio steps between each of the adjacent forward speed ratios as well as between the reverse and first forward speed ratio. The chart also gives the numerical value for the overall ratio spread of the forward speed ratios. These numerical values are determined from the speed ratio values given in the truth table.

The reverse speed ratio is established with the engagement of the torque-transmitting mechanisms 154 and 158. During the reverse speed ratio, the ring gear member 144 and therefore output shaft 19 are rotated at a speed determined by the speed of the sun gear member 142 and the ring gear/sun gear tooth ratio of the planetary gearset 140. The numerical value of the reverse speed ratio is determined by the ring gear/sun gear tooth ratio of the planetary gearset 140.

The first forward speed ratio is established with the engagement of the torque-transmitting mechanisms 154 and 156. During the first forward speed ratio, the planet carrier assembly member 146 and sun gear member 132 are rotated at a speed determined by the speed of the sun gear member 142, the speed of the ring gear member 144, and the ring gear/sun gear tooth ratio of the planetary gearset 140. The planet carrier assembly member 136 and ring gear member 124 are rotated at a speed determined by the speed of the sun gear member 132, the speed of the ring gear member 134, and the ring gear/sun gear tooth ratio of the planetary gearset 130. The planet carrier assembly member 126, ring gear member 134, ring gear member 144 and therefore output shaft 19 are rotated at a speed determined by the speed of the ring gear member 124 and the ring gear/sun gear tooth ratio of the planetary gearset 120. The numerical value of the first forward speed ratio is determined by the ring gear/sun gear tooth ratios of all three planetary gearsets 120, 130, and 140.

The second forward speed ratio is established with the engagement of the torque-transmitting mechanisms 152 and 156. During the second forward speed ratio, the planet carrier assembly member 136 and ring gear member 124 are rotated at a speed determined by the speed of the sun gear member 132, the speed of the ring gear member 134, and the ring gear/sun gear tooth ratio of the planetary gearset 130. The planet carrier assembly member 126, ring gear member 134, ring gear member 144 and therefore output shaft 19 are rotated at a speed determined by the speed of the ring gear member 124 and the ring gear/sun gear tooth ratio of the planetary gearset 120. The numerical value of the second forward speed ratio is determined by the ring gear/sun gear tooth ratios of the planetary gearsets 120 and 130.

The third forward speed ratio is established with the engagement of the torque-transmitting mechanisms 150 and 156. This combination of engagements effectively connects the input shaft 17 with the output shaft 19 through the planetary gear arrangement 118. Therefore the numerical value of the third forward speed ratio is one.

The fourth forward speed ratio is established with the engagement of the torque-transmitting mechanisms 152 and 160. During the fourth forward speed ratio, the ring gear member 134 and planet carrier assembly member 126 are rotated at a speed determined by the speed of the sun gear member 132, the speed of the planet carrier assembly member 136, and the ring gear/sun gear tooth ratio of the planetary gearset 130. The ring gear member 124, planet carrier assembly member 136, and sun gear member 142 are rotated at a speed determined by the speed of the planet carrier assembly member 126 and the ring gear/sun gear tooth ratio of the planetary gearset 120. The ring gear member 144 and therefore output shaft 19 are rotated at a speed determined by the speed of the planet carrier assembly member 146, the speed of the sun gear member 142, and the ring gear/sun gear tooth ratio of the planetary gearset 140. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 154 and 160. During the fifth forward speed ratio, the planet carrier assembly member 126 and ring gear member 134 are rotated at a speed determined by the speed of the ring gear member 124 and the ring gear/sun gear tooth ratio of the planetary gearset 120. The sun gear member 132 and planet carrier assembly member 146 are rotated at a speed determined by the speed of the ring gear member 134, the speed of the planet carrier assembly member 136, and the ring gear/sun gear tooth ratio of the planetary gearset 130. The ring gear member 144 and therefore output shaft 19 are rotated at a speed determined by the speed of the sun gear member 142, the speed of the planet carrier assembly member 146, and the ring gear/sun gear tooth ratio of the planetary gearset 140. The numerical value of the fifth forward speed ratio is determined by the ring gear/sun gear tooth ratios of all three planetary gearsets 120, 130, and 140.

The sixth forward speed ratio is established with the engagement of the torque-transmitting mechanisms 150 and 160. During the sixth forward speed ratio, the ring gear member 124, planet carrier assembly member 136, and sun gear member 142 are rotated at a speed determined by the speed of the planet carrier assembly member 126 and the ring gear/sun gear tooth ratio of the planetary gearset 120. The sun gear member 132 and planet carrier assembly member 146 are rotated at a speed determined by the speed of the ring gear member 134, the speed of the planet carrier assembly member 136, and the ring gear/sun gear tooth ratio of the planetary gearset 130. The ring gear member 144 and therefore output shaft 19 are rotated at a speed determined by the speed of the planet carrier assembly member 146, the speed of the sun gear member 142, and the ring gear/sun gear tooth ratio of the planetary gearset 140. The numerical value of the sixth forward speed ratio is determined by the ring gear/sun gear tooth ratios of all three planetary gearsets 120, 130, and 140.

The seventh forward speed ratio is established with the engagement of the torque-transmitting mechanisms 150 and 154. During the seventh forward speed ratio, the ring gear member 124 and planet carrier assembly member 136 are rotated at a speed determined by the speed of the planet carrier assembly member 126 and the ring gear/sun gear tooth ratio of the planetary gearset 120. The sun gear member 132 and planet carrier assembly member 146 are rotated at a speed determined by the speed of the ring gear member 134, the speed of the planet carrier assembly member 136, and the ring gear/sun gear tooth ratio of the planetary gearset 130. The ring gear member 144 and therefore output shaft 19 are rotated at a speed determined by the speed of the sun gear member 142, the speed of the planet carrier assembly member 146, and the ring gear/sun gear tooth ratio of the planetary gearset 140. The numerical value of the seventh forward speed ratio is determined by the ring gear/sun gear tooth ratios of all three planetary gearsets 120, 130, and 140.

Figures 5, 6:
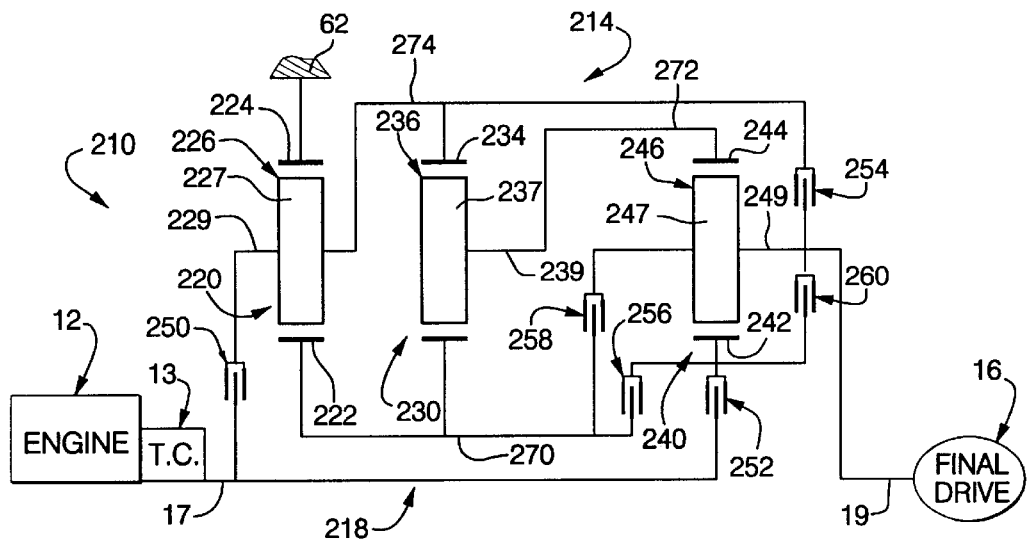
FIG. 5 is a schematic representation of a powertrain having a planetary transmission incorporating another embodiment of the present invention.
FIG. 6 is a truth table and chart providing some of the operating characteristics of the embodiment shown in FIG. 5.

A powertrain 210, shown in FIG. 5, includes the engine 12, the starting device 13, a planetary transmission 214, and the final drive mechanism 16. The planetary transmission 214 includes the input shaft 17, a planetary gear arrangement 218, and the output shaft 19. The planetary gear arrangement 218 includes three simple planetary gearsets 220, 230, and 240, and six rotating type torque-transmitting mechanisms 250, 252, 254, 256, 258, and 260.

The planetary gearset 220 includes a sun gear member 222, a ring gear member 224, and a planet carrier assembly member 226. The planet carrier assembly member 226 includes a plurality of pinion gear members 227 rotatably mounted on a planet carrier member 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gear members 237 rotatably mounted on a planet carrier member 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gear members 247 rotatably mounted on a planet carrier member 249 and disposed in meshing relationship with both the sun gear member 242 and the ring gear member 244.

The sun gear member 222 and sun gear member 232 are continuously interconnected by an interconnecting member 270. The planet carrier assembly member 236 and ring gear member 244 are continuously interconnected by an interconnecting member 272. The planet carrier assembly member 226 and ring gear member 234 are continuously interconnected by an interconnecting member 274. The ring gear member 224 is continuously interconnected with the transmission housing 62. The output shaft 19 is continuously interconnected with the planet carrier assembly member 246.

The input shaft 17 is selectively interconnectible with the interconnecting member 274 through the torque-transmitting mechanism 250, and selectively interconnectible with the sun gear member 242 through the torque-transmitting mechanism 252. The interconnecting member 274 is selectively interconnectible with the output shaft 19 through the torque-transmitting mechanism 254. The sun gear member 242 is selectively interconnectible with the interconnecting member 270 through the torque-transmitting mechanism 256. The interconnecting member 270 is selectively interconnectible with the output shaft 19 through the torque-transmitting mechanism 258. The sun gear member 242 is selectively interconnectible with the output shaft 19 through the torque-transmitting mechanism 260.

The torque-transmitting mechanisms are selectively engaged in combinations of two, as shown in the truth table of FIG. 6, to provide seven forward speed ratios and one reverse speed ratio between the input shaft 17 and the output shaft 19. The truth table also provides numerical examples of speed ratios that are available with the planetary gear arrangement when the ring gear/sun gear tooth ratios R1/S1, R2/S2, and R3/S3 are employed. These ring gear/sun gear tooth ratios represent the ring gear/sun gear tooth ratios of the planetary gearsets 220, 230, and 240, respectively. Also given in FIG. 6 is the numerical value of the ratio steps between adjacent forward speed ratios as well as between the reverse and first forward speed ratio. This information is given in a chart, which also provides the numerical value for the overall ratio spread of the forward speed ratios.

The reverse speed ratio is established with the engagement of the torque-transmitting mechanisms 252 and 254. During the reverse speed ratio, the ring gear member 244 and planet carrier assembly member 236 are rotated at a speed determined by the speed of the sun gear member 242, the speed of the planet carrier assembly member 246, and the ring gear/sun gear tooth ratio of the planetary gearset 240. The sun gear members 232 and 222 are rotated at a speed determined by the speed of the planet carrier assembly member 236, the speed of the ring gear member 234, and the ring gear/sun gear tooth ratio of the planetary gearset 230. The planet carrier assembly member 226, ring gear member 234, planet carrier assembly member 246, and output shaft 19 are rotated at a speed determined by the speed of the sun gear member 222 and the ring gear/sun gear tooth ratio of the planetary gearset 220. The numerical value of the reverse speed ratio is determined by the ring gear/sun gear tooth ratios of all three planetary gearsets 220, 230, and 240.

The first forward speed ratio is established with the engagement of the torque-transmitting mechanisms 252 and 258. During the first forward speed ratio, the ring gear member 244 and planet carrier assembly member 236 are rotated at a speed determined by the speed of the sun gear member 242, the speed of the planet carrier assembly member 246, and the ring gear/sun gear tooth ratio of the planetary gearset 240. The ring gear member 234 and planet carrier assembly member 226 are rotated at a speed determined by the speed of the planet carrier assembly member 236, the speed of the sun gear member 232, and the ring gear/sun gear tooth ratio of the planetary gearset 230. The sun gear members 222 and 232, the planet carrier assembly member 246, and output shaft 19 are rotated at a speed determined by the speed of the planet carrier assembly member 226 and the ring gear/sun gear tooth ratio of the planetary gearset 220. The numerical value of the first forward speed ratio is determined by the ring gear/sun gear tooth ratios of all three planetary gearsets 220, 230, and 240.

The second forward speed ratio is established with the engagement of the torque-transmitting mechanisms 252 and 256. During the second forward speed ratio, the planet carrier assembly member 226 and ring gear member 234 are rotated at a speed determined by the speed of the sun gear member 222 and the ring gear/sun gear tooth ratio of the planetary gearset 220. The planet carrier assembly member 236 and ring gear member 244 are rotated at a speed determined by the speed of the sun gear member 232, the speed of the ring gear member 234, and the ring gear/sun gear tooth ratio of the planetary gearset 230. The planet carrier assembly member 246 and therefore output shaft 19 are rotated at a speed determined by the speed of the sun gear member 242, the speed of the ring gear member 244, and the ring gear/sun gear tooth ratio of the planetary gearset 240. The numerical value of the second forward speed ratio is determined by the ring gear/sun gear tooth ratios of all three planetary gearsets 220, 230, and 240.

The third forward speed ratio is established with the engagement of the torque-transmitting mechanisms 252 and 260. During the third forward speed ratio, the input shaft 17, the planetary gearset 240, and output shaft 19 are all rotated in unison. The numerical value of the third forward speed ratio is one.

The fourth forward speed ratio is established with the engagement of the torque-transmitting mechanisms 250 and 252. During the fourth forward speed ratio, the sun gear members 222 and 232 are rotated at a speed determined by the speed of the planet carrier assembly member 226 and the ring gear/sun gear tooth ratio of the planetary gearset 220. The planet carrier assembly member 236 and ring gear member 244 are rotated at a speed determined by the speed of the ring gear member 234, the speed of the sun gear member 232, and the ring gear/sun gear tooth ratio of the planetary gearset 230. The planet carrier assembly member 246 and therefore output shaft 19 are rotated at a speed determined by the speed of the sun gear member 242, the speed of the ring gear member 244, and the ring gear/sun gear tooth ratio of the planetary gearset 240. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250 and 260. During the fifth forward speed ratio, the sun gear members 222 and 232 are rotated at a speed determined by the speed of the planet carrier assembly member 226 and the ring gear/sun gear tooth ratio of the planetary gearset 220. The planet carrier assembly member 236, planetary gearset 240, and output shaft 19 are rotated at a speed determined by the speed of the sun gear member 232, the speed of the ring gear member 234, and the ring gear/sun gear tooth ratio of the planetary gearset 230. The numerical value of the fifth forward speed ratio is determined by the ring gear/sun gear tooth ratios of the planetary gearsets 220 and 230.

The sixth forward speed ratio is established with the engagement of the torque-transmitting mechanisms 250 and 256. During the sixth forward speed ratio, the sun gear members 222, 232, and 242 are rotated at a speed determined by the speed of the planet carrier assembly member 226 and the ring gear/sun gear tooth ratio of the planetary gearset 220. The planet carrier assembly member 236 and ring gear member 244 are rotated at a speed determined by the speed of the ring gear member 234, the speed of the sun gear member 232, and the ring gear/sun gear tooth ratio of the planetary gearset 230. The planet carrier assembly member 246 and therefore output shaft 19 are rotated at a speed determined by the speed of the sun gear member 242, the speed of the ring gear member 244, and the ring gear/sun gear tooth ratio of the planetary gearset 240. The numerical value of the sixth forward speed ratio is determined by the ring gear/sun gear tooth ratios of all three planetary gearsets 220, 230, and 240.

The seventh forward speed ratio is established with the engagement of the torque-transmitting mechanisms 250 and 258. During the seventh forward speed ratio, the sun gear members 222 and 232, planet carrier assembly member 246, and output shaft 19 are rotated at a speed determined by the speed of the planet carrier assembly member 226 and the ring gear/sun gear tooth ratio of the planetary gearset 220. The numerical value of the seventh forward speed ratio is determined by the ring gear/sun gear tooth ratio of the planetary gearset 220.

Figures 7, 8:
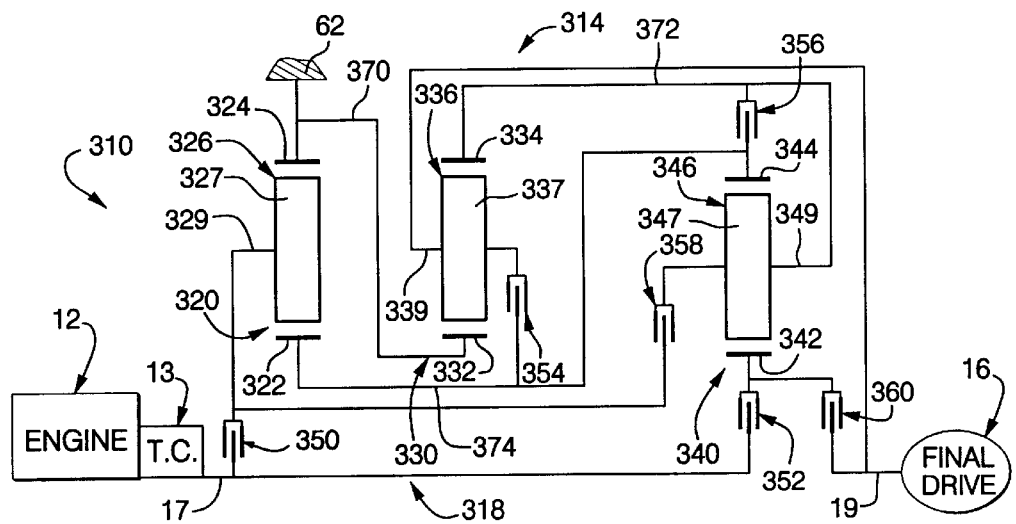
FIG. 7 is a schematic representation of a powertrain having a planetary transmission incorporating another embodiment of the present invention.
FIG. 8 is a truth table and chart providing some of the operating characteristics of the embodiment shown in FIG. 7.

A powertrain 310, shown in FIG. 7, includes the engine 12, the starting device 13, a planetary transmission 314, and the final drive mechanism 16. The planetary transmission 314 includes the input shaft 17, a planetary gear arrangement 318, and the output shaft 19. The planetary gear arrangement 318 includes three simple planetary gearsets 320, 330, and 340, and six rotating type torque-transmitting mechanisms 350, 352, 354, 356, 358, and 360.

The planetary gearset 320 includes a sun gear member 322, a ring gear member 324, and a planet carrier assembly member 326. The planet carrier assembly member 326 includes a plurality of pinion gear members 327 rotatably mounted on a planet carrier member 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gear members 337 rotatably mounted on a planet carrier member 339 and disposed in meshing relationship with both the sun gear member 332 and the ring gear 30 member 334.

The planetary gearset 340 includes a sun gear member 342, a ring gear member 344, and a planet carrier assembly member 346. The planet carrier assembly member 346 includes a plurality of pinion gear members 347 rotatably mounted on a planet carrier member 349 and disposed in meshing relationship with both the sun gear member 342 and the ring gear member 344.

The ring gear member 324 and sun gear member 332 are continuously interconnected by an interconnecting member 370, which is continuously interconnected with the transmission housing 62. The ring gear member 334 and planet carrier assembly member 346 are continuously interconnected by an interconnecting member 372. The sun gear member 322 and ring gear member 344 are continuously interconnected by an interconnecting member 374. The output shaft 19 is continuously interconnected with the planet carrier assembly member 336.

The input shaft 17 is selectively interconnectible with the planet carrier assembly member 326 through the torque-transmitting mechanism 350, and selectively interconnectible with the sun gear member 342 through the torque-transmitting mechanism 352. The interconnecting member 374 is selectively interconnectible with the output shaft 19 through the torque-transmitting mechanism 354. The interconnecting member 372 is selectively interconnectible with the interconnecting member 374 through the torque-transmitting mechanism 356. The planet carrier assembly member 326 is selectively interconnectible with the interconnecting member 372 through the torque-transmitting mechanism 358. The sun gear member 342 is selectively interconnectible with the output shaft 19 through the torque-transmitting mechanism 360.

The torque-transmitting mechanisms are selectively engaged in combinations of two, as shown in the truth table of FIG. 8, to provide a reverse speed ratio and seven forward speed ratios between the input shaft 17 and the output shaft 19. Also given in the truth table is a numerical example of possible ring gear/sun gear tooth ratios for the planetary gear arrangement 318 when the ring gear/sun gear tooth ratios R1/S1, R2/S2, and R3/S3 are employed. These ring gear/sun gear tooth ratios represent the ring gear/sun gear tooth ratio values of the planetary gearsets 320, 330, and 340, respectively. The chart in FIG. 8 provides the numerical value for the ratio steps between adjacent forward speed ratios as well as between the reverse and first forward speed ratio. The chart also gives the numerical value for the overall ratio spread of the forward speed ratios.

The reverse speed ratio is established with the engagement of the torque-transmitting mechanisms 352 and 358. During the reverse speed ratio, the ring gear member 344 and sun gear member 322 are rotated at a speed determined by the speed of the sun gear member 342, the speed of the planet carrier assembly member 346, and the ring gear/sun gear tooth ratio of the planetary gearset 340. The planet carrier assembly member 326, planet carrier assembly member 346, and ring gear member 334 are rotated at a speed determined by the speed of the sun gear member 322 and the ring gear/sun gear tooth ratio of the planetary gearset 320. The planet carrier assembly member 336 and therefore output shaft 19 are rotated at a speed determined by the speed of the ring gear member 334 and the ring gear/sun gear tooth ratio of the planetary gearset 330. The numerical value of the reverse speed ratio is determined by the ring gear/sun gear tooth ratios of all three planetary gearsets 320, 330, and 340.

The first forward speed ratio is established with the engagement of the torque-transmitting mechanisms 352 and 354. During the first forward speed ratio, the planet carrier assembly member 346 and ring gear member 334 are rotated at a speed determined by the speed of the sun gear member 342, the speed of the ring gear member 344, and the ring gear/sun gear tooth ratio of the planetary gearset 340. The planet carrier assembly member 336 and therefore output shaft 19 are rotated at a speed determined by the speed of the ring gear member 334 and the ring gear/sun gear tooth ratio of the planetary gearset 330. The numerical value of the first forward speed ratio is determined by the ring gear/sun gear tooth ratios of the planetary gearsets 330 and 340.

The second forward speed ratio is established with the engagement of the torque-transmitting mechanisms 352 and 356. During the second forward speed ratio, the planet carrier assembly member 336 and therefore output shaft 19 are rotated at a speed determined by the speed of the ring gear member 334 and the ring gear/sun gear tooth ratio of the planetary gearset 330. The numerical value of the second forward speed ratio is determined by the ring gear/sun gear tooth ratio of the planetary gearset 330.

The third forward speed ratio is established with the engagement of the torque-transmitting mechanisms 352 and 360. During the third forward speed ratio, the input shaft 17, sun gear member 342, and output shaft 19, rotate in unison. Therefore, the numerical value of the third forward speed ratio is one.

The fourth forward speed ratio is established with the engagement of the torque-transmitting mechanisms 350 and 352. During the fourth forward speed ratio, the sun gear member 322 and ring gear member 344 are rotated at a speed determined by the speed of the planet carrier assembly member 326 and the ring gear/sun gear tooth ratio of the planetary gearset 320. The planet carrier assembly member 346 and ring gear member 334 are rotated at a speed determined by the speed of the ring gear member 344, the speed of the sun gear member 342, and the ring gear/sun gear tooth ratio of the planetary gearset 340. The planet carrier assembly member 336 and therefore output shaft 19 are rotated at a speed determined by the speed of the ring gear member 334 and the ring gear/sun gear tooth ratio of the planetary gearset 330. The numerical value of the fourth forward speed ratio is determined by the ring gear/sun gear tooth ratios of all three planetary gearsets 320, 330, and 340.

The fifth forward speed ratio is established with the engagement of the torque-transmitting mechanisms 350 and 360. During the fifth forward speed ratio, the sun gear member 322 and ring gear member 344 are rotated at a speed determined by the speed of the planet carrier assembly member 326 and the ring gear/sun gear tooth ratio of the planetary gearset 320. The planet carrier assembly member 346 and ring gear member 334 are rotated at a speed determined by the speed of the ring gear member 344, the speed of the sun gear member 342, and the ring gear/sun gear tooth ratio of the planetary gearset 340. The planet carrier assembly member 336 and therefore output shaft 19 are rotated at a speed determined by the speed of the ring gear member 334 and the ring gear/sun gear tooth ratio of the planetary gearset 330. The numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 350 and 356. During the sixth forward speed ratio, the sun gear member 322 and ring gear member 334 are rotated at a speed determined by the speed of the planet carrier assembly member 326 and the ring gear/sun gear tooth ratio of the planetary gearset 320. The planet carrier assembly member 336 and output shaft 19 are rotated at a speed determined by the speed of the ring gear member 334 and the ring gear/sun gear tooth ratio of the planetary gearset 330. The numerical value of the sixth forward speed ratio is determined by the ring gear/sun gear tooth ratios of the planetary gearsets 320 and 330. During the sixth forward speed ratio, the planetary gearset 340 rotates in unison with the ring gear member 334.

The seventh forward speed ratio is established with the engagement of the torque-transmitting mechanisms 350 and 354. During the seventh forward speed ratio, the planet carrier assembly member 336 and therefore output shaft 19 are rotated at a speed determined by the speed of the planet carrier assembly member 326 and the ring gear/sun gear tooth ratio of the planetary gearset 320. The numerical value of the seventh forward speed ratio is determined by the ring gear/sun gear tooth ratio of the planetary gearset 320. Note that the sun gear member 322 and planet carrier assembly member 336 are rotated in unison during the seventh forward speed ratio.

Figures 9, 10:
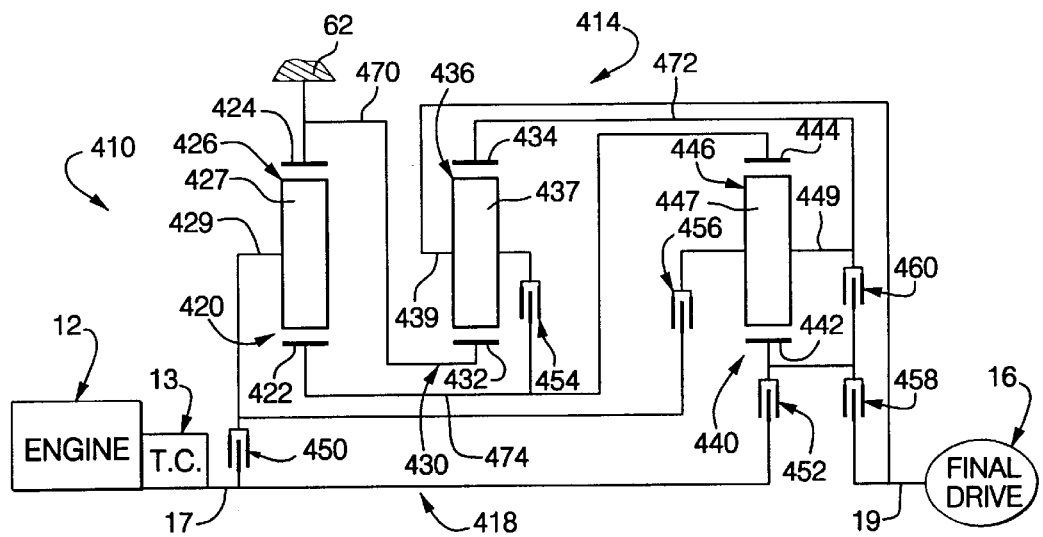
FIG. 9 is a schematic representation of a powertrain having a planetary transmission incorporating another embodiment of the present invention.
FIG. 10 is a truth table and chart providing some of the operating characteristics of the embodiment shown in FIG. 9.

A powertrain 410, shown in FIG. 9, includes the engine 12, the starting device 13, a planetary transmission 414, and the final drive mechanism 16. The planetary transmission 414 includes the input shaft 17, a planetary gear arrangement 418, and the output shaft 19. The planetary gear arrangement 418 includes three simple planetary gearsets 420, 430, and 440, and six rotating type torque-transmitting mechanisms 450, 452, 454, 456, 458, and 460.

The planetary gearset 420 includes a sun gear member 422, a ring gear member 424, and a planet carrier assembly member 426. The planet carrier assembly member 426 includes a plurality of pinion gear members 427 rotatably mounted on a planet carrier member 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gear members 437 rotatably mounted on a planet carrier member 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gear members 447 rotatably mounted on a planet carrier member 449 and disposed in meshing relationship with both the sun gear member 442 and the ring gear member 444.

The ring gear member 424 and sun gear member 432 are continuously interconnected by an interconnecting member 470, which is also continuously interconnected with the transmission housing 62. The ring gear member 434 and planet carrier assembly member 446 are continuously interconnected by an interconnecting member 472. The sun gear member 422 and ring gear member 444 are continuously interconnected by an interconnecting member 474. The output shaft 19 is continuously interconnected with the planet carrier assembly member 436.

The input shaft 17 is selectively interconnectible with the planet carrier assembly member 426 through the torque-transmitting mechanism 450, and selectively interconnectible with the sun gear member 442 through the torque-transmitting mechanism 452. The interconnecting member 472 is selectively interconnectible with the interconnecting member 474 through the torque-transmitting mechanism 454. The planet carrier assembly member 426 is selectively interconnectible with the interconnecting member 472 through the torque-transmitting mechanism 456. The sun gear member 442 is selectively interconnectible with the output shaft 19 through the torque-transmitting mechanism 458. The sun gear member 442 is also selectively interconnectible with the interconnecting member 472 through the torque-transmitting mechanism 460.

The torque-transmitting mechanisms are selectively engaged in combinations of two, as shown in the truth table of FIG. 10, to establish seven forward speed ratios and one reverse speed ratio between the input shaft 17 and the output shaft 19. The truth table of FIG. 10 also provides a numerical example for speed ratios that are available with planetary gear arrangement 418 when the ring gear/sun gear tooth ratios R1/S1, R2/S2, and R3/S3 are utilized. These ratios are the ring gear/sun gear tooth ratios of the planetary gearsets 420, 430, and 440, respectively. Also provided in FIG. 10 is a chart giving the numerical value for the ratio steps between adjacent forward speed ratios as well as between the reverse and the first forward speed ratio. The numerical value for the overall ratio spread for the forward speed ratios is also given in the chart.

The reverse speed ratio is established with the engagement of the torque-transmitting mechanisms 452 and 456. During the reverse speed ratio, the ring gear member 444 and sun gear member 422 are rotated at a speed determined by the speed of the sun gear member 422, the speed of the planet carrier assembly member 446, and the ring gear/sun gear tooth ratio of the planetary gearset 440. The planet carrier assembly member 426, planet carrier assembly member 446, and ring gear member 434 are rotated at a speed determined by the speed of the sun gear member 422 and the ring gear/sun gear tooth ratio of the planetary gearset 420. The planet carrier assembly member 436 and therefore output shaft 19 are rotated at a speed determined by the speed of the ring gear member 434 and the ring gear/sun gear tooth ratio of the planetary gearset 430. The numerical value of the reverse speed ratio is determined by the ring gear/sun gear tooth ratios of all three planetary gearsets 420, 430, and 440.

The first forward speed ratio is established with the engagement of the torque-transmitting mechanisms 452 and 454. During the first forward speed ratio, the planet carrier assembly member 446 and ring gear member 434 are rotated at a speed determined by the speed of the sun gear member 442, the speed of the ring gear member 444, and the ring gear/sun gear tooth ratio of the planetary gearset 440. The ring gear member 444, planet carrier assembly member 436 and therefore output shaft 19 are rotated at a speed determined by the speed of the ring gear member 434 and the ring gear/sun gear tooth ratio of the planetary gearset 430. The numerical value of the first forward speed ratio is determined by the ring gear/sun gear tooth ratios of the planetary gearsets 430 and 440.

The second forward speed ratio is established with the engagement of the torque-transmitting mechanisms 452 and 460. During the second forward speed ratio, the planet carrier assembly member 436 is rotated at a speed determined by the speed of the ring gear member 434 and the ring gear/sun gear tooth ratio of the planetary gearset 430. The numerical value of the second forward speed ratio is determined by the ring gear/sun gear tooth ratio of the planetary gearset 430. It should be noted in the second forward speed ratio that the planetary gearset 440 and the ring gear member 434 are rotated in unison with the input shaft 17.

The third forward speed ratio is established with the engagement of the torque-transmitting mechanisms 452 and 458. During the third forward speed ratio, the input shaft 17, sun gear member 442, planet carrier assembly member 436 and therefore output shaft 19 are rotated in unison. The numerical value of the third forward speed ratio is one.

The fourth forward speed ratio is established with the engagement of the torque-transmitting mechanisms 450 and 452. During the fourth forward speed ratio, the sun gear member 422 and ring gear member 444 are rotated at a speed determined by the speed of the planet carrier assembly member 426 and the ring gear/sun gear tooth ratio of the planetary gearset 420. The planet carrier assembly member 446 and ring gear member 434 are rotated at a speed determined by the speed of the ring gear member 444, the speed of the sun gear member 442, and the ring gear/sun gear tooth ratio of the planetary gearset 440. The planet carrier assembly member 436 and therefore output shaft 19 are rotated at a speed determined by the speed of the ring gear member 434 and the ring gear/sun gear tooth ratio of the planetary gearset 430. The numerical value of the fourth forward speed ratio is determined by the ring gear/sun gear tooth ratios of all three planetary gearsets 420, 430, and 440.

The fifth forward speed ratio is established with the engagement of the torque-transmitting mechanisms 450 and 458. During the fifth forward speed ratio, the sun gear member 422 and ring gear member 444 are rotated at a speed determined by the speed of the planet carrier assembly member 426 and the ring gear/sun gear tooth ratio of the planetary gearset 420. The planet carrier assembly member 446 and ring gear member 434 are rotated at a speed determined by the speed of the ring gear member 444, the speed of the sun gear member 442, and the ring gear/sun gear tooth ratio of the planetary gearset 440. The sun gear member 422, planet carrier assembly member 436, and the output shaft 19 are rotated at a speed determined by the speed of the ring gear member 434 and the ring gear/sun gear tooth ratio of the planetary gearset 430. The numerical value of the fifth forward speed ratio is determined by the ring gear/sun gear tooth ratios of all three planetary gearsets 420, 430, and 440.

The sixth forward speed ratio is established with the engagement of the torque-transmitting mechanisms 450 and 460. During the sixth forward speed ratio, the sun gear member 422, planetary gearset 440, and ring gear member 434 are rotated at a speed determined by the speed of the planet carrier assembly member 426 and the ring gear/sun gear tooth ratio of the planetary gearset 420. The planet carrier assembly member 436 and therefore output shaft 19 are rotated at a speed determined by the speed of the ring gear member 434 and the ring gear/sun gear tooth ratio of the planetary gearset 430. The numerical value of the sixth forward speed ratio is determined by the ring gear/sun gear tooth ratios of the planetary gearsets 420 and 430.

The seventh forward speed ratio is established with the engagement of the torque-transmitting mechanisms 450 and 454. During the seventh forward speed ratio, the sun gear member 422, planet carrier assembly member 436, and the output shaft 19 all rotate in unison. The speed of the sun gear member 422 and therefore the output shaft 19 are determined by the speed of the planet carrier assembly member 426 and the ring gear/sun gear tooth ratio of the planetary gearset 420. The numerical value of the seventh forward speed ratio is determined by the ring gear/sun gear tooth ratio of the planetary gearset 420.

Figures 11, 12:
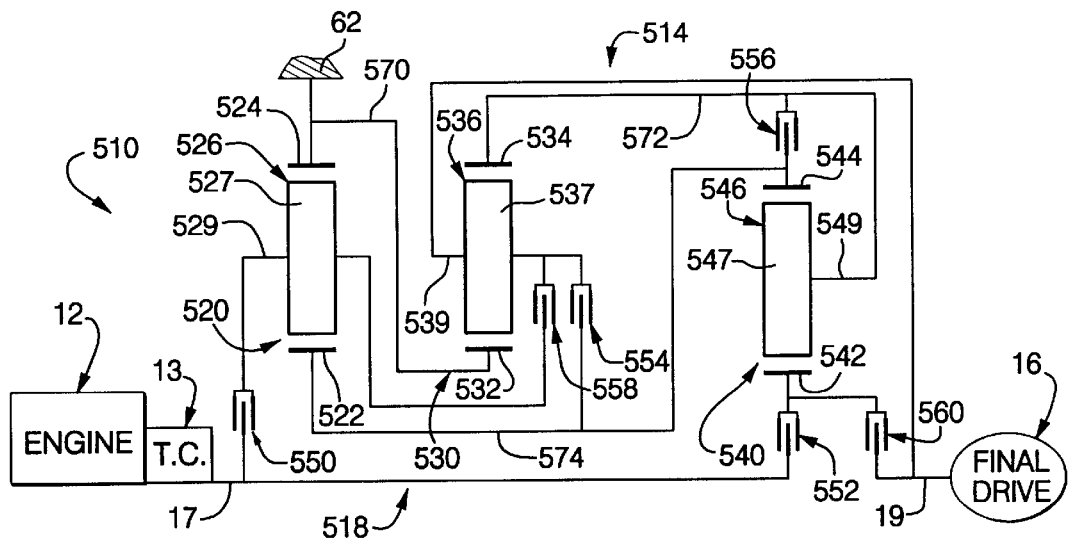
FIG. 11 is a schematic representation of a powertrain having a planetary transmission incorporating another embodiment of the present invention.
FIG. 12 is a truth table and chart providing some of the operating characteristics of the embodiment shown in FIG. 11.

A powertrain 510, shown in FIG. 11, includes the engine 12, the starting device 13, a planetary transmission 514, and the final drive mechanism 16. The planetary transmission 514 includes the input shaft 17, a planetary gear arrangement 518, and the output shaft 19. The planetary gear arrangement 518 includes three simple planetary gearsets 520, 530, and 540, and six rotating type torque-transmitting mechanisms 550, 552, 554, 556, 558, and 560.

The planetary gearset 520 includes a sun gear member 522, a ring gear member 524, and a planet carrier assembly member 526. The planet carrier assembly member 526 includes a plurality of pinion gear members 527 rotatably mounted on a planet carrier member 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gear members 537 rotatably mounted on a planet carrier member 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gear members 547 rotatably mounted on a planet carrier member 549 and disposed in meshing relationship with both the sun gear member 542 and the ring gear member 544.

The ring gear member 524 and sun gear member 532 are continuously interconnected by an interconnecting member 570, which is continuously interconnected with the transmission housing 62. The ring gear member 534 and planet carrier assembly member 546 are continuously interconnected by an interconnecting member 572. The sun gear member 522 and ring gear member 544 are continuously interconnected by an interconnecting member 574. The output shaft 19 is continuously interconnected with the planet carrier assembly member 536.

The input shaft 17 is selectively interconnectible with the planet carrier assembly member 526 through the torque-transmitting mechanism 550, and selectively interconnectible with the sun gear member 542 through the torque-transmitting mechanism 552. The planet carrier assembly member 536 and therefore output shaft 19 are selectively interconnectible with the ring gear member 544 through the torque-transmitting mechanism 554, and selectively interconnectible with the planet carrier assembly member 526 through the torque-transmitting mechanism 558. The ring gear member 544 is selectively interconnectible with the interconnecting member 572 through the torque-transmitting mechanism 556. The sun gear member 542 is selectively interconnectible with the output shaft 19 through the torque-transmitting mechanism 560.

The torque-transmitting mechanisms are selectively engaged in combinations of two, as shown in the truth table of FIG. 12, to establish seven forward speed ratios and one reverse speed ratio between the input shaft 17 and the output shaft 19. Also given in the truth table of FIG. 12 is a numerical example for each of the forward speed ratios and the reverse speed ratio of the planetary gear arrangement 518 when the ring gear/sun gear tooth ratios of the planetary gearsets 520, 530, and 540 are chosen as R1/S1, R2/S2, and R3/S3, respectively. A chart of FIG. 12 gives the numerical values for the ratio steps between adjacent forward speed ratios as well as between the reverse and first forward speed ratio. Also, the overall ratio spread of the forward speed ratios is given in the chart.

Upon reviewing the engagement combinations in the truth table and the connections within the planetary gear arrangement 518, those skilled in the art will recognize that the numerical value of the reverse speed ratio is determined by the ring gear/sun gear tooth ratios of all three planetary gearsets 520, 530, and 540. The numerical value of the first forward speed ratio is determined by the ring gear/sun gear tooth ratios of the planetary gearsets 530 and 540. The numerical value of the second forward speed ratio is determined by the ring gear/sun gear tooth ratio of the planetary gearset 530. The numerical value of the third forward speed ratio is one. The numerical value of the fourth forward speed ratio and the fifth forward speed ratio is determined by the ring gear/sun gear tooth ratios of all three planetary gearsets 520, 530, and 540. The numerical value of the sixth forward speed ratio is determined by the ring gear/sun gear tooth ratios of the planetary gearsets 520 and 530. The numerical value of the seventh forward speed ratio is determined by the ring gear/sun gear tooth ratio of the planetary gearset 520.

Figures 13, 14:
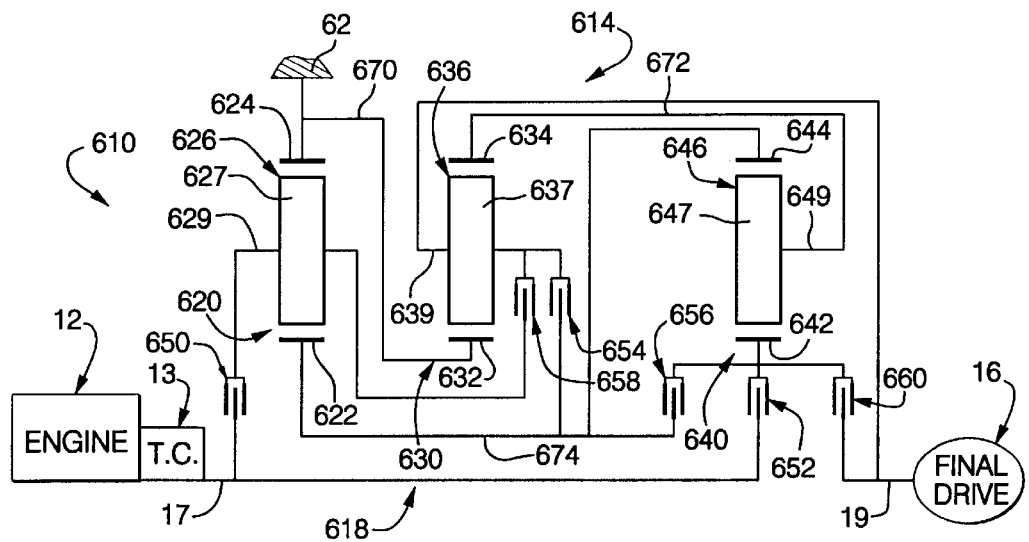
FIG. 13 is a schematic representation of a powertrain having a planetary transmission incorporating another embodiment of the present invention.
FIG. 14 is a truth table and chart providing some of the operating characteristics of the embodiment shown in FIG. 13.

A powertrain 610, shown in FIG. 13, includes the engine 12, the starting device 13, a planetary transmission 614, and the final drive mechanism 16. The planetary transmission 614 includes the input shaft 17, a planetary gear arrangement 618, and the output shaft 19. The planetary gear arrangement 618 includes three simple planetary gearsets 620, 630, and 640, and six rotating type torque-transmitting mechanisms 650, 652, 654, 656, 658, and 660.

The planetary gearset 620 includes a sun gear member 622, a ring gear member 624, and a planet carrier assembly member 626. The planet carrier assembly member 626 includes a plurality of pinion gear members 627 rotatably mounted on a planet carrier member 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gear members 637 rotatably mounted on a planet carrier member 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gear members 647 rotatably mounted on a planet carrier member 649 and disposed in meshing relationship with both the sun gear member 642 and the ring gear member 644.

The ring gear member 624 and sun gear member 632 are continuously interconnected by an interconnecting member 670, which is also continuously interconnected with the transmission housing 62. The ring gear member 634 and planet carrier assembly member 646 are continuously interconnected by an interconnecting member 672. The sun gear member 622 and ring gear member 644 are continuously interconnected by an interconnecting member 674. The output shaft 19 is continuously interconnected with the planet carrier assembly member 636.

The input shaft 17 is selectively interconnectible with the planet carrier assembly member 626 through the torque-transmitting mechanism 650, and selectively interconnectible with the sun gear member 632 through the torque-transmitting mechanism 652. The planet carrier assembly member 636 and therefore output shaft 19 are selectively interconnectible with the interconnecting member 674 through the torque-transmitting mechanism 654, and selectively interconnectible with the planet carrier assembly member 626 through the torque-transmitting mechanism 658. The sun gear member 642 is selectively interconnectible with the interconnecting member 674 through the torque-transmitting mechanism 656. The sun gear member 642 is selectively interconnectible with the output shaft 19 through the torque-transmitting mechanism 660.

As seen in the truth table of FIG. 14, the torque-transmitting mechanisms are engaged in combinations of two in a sequence that provides seven forward speed ratios and one reverse speed ratio between the input shaft 17 and the output shaft 19. Also given in the truth table is a numerical example of the speed ratios that are available with the planetary gear arrangement 618 when the ring gear/sun gear tooth ratios of the planetary gearsets 620, 630, and 640 are as given in R1/S1, R2/S2, and R3/S3, respectively. Also provided in FIG. 14 is a chart giving the numerical value of the ratio steps between adjacent forward speed ratios as well as between the reverse and the first forward speed ratio. The numerical value of the overall ratio spread of the forward speed ratios is also provided in the chart. The numerical values of the ratio steps and ratio spread are established utilizing the example speed ratio numbers given in the truth table of FIG. 14.

Those skilled in the art will recognize, upon reviewing the engagement combinations and the interconnections of the planetary gear arrangement 618, that the numerical value of the reverse speed ratio, the fourth forward speed ratio, and the fifth forward speed ratio are determined by the ring gear/sun gear tooth ratios of all three planetary gearsets 620, 630, and 640. The numerical value of the first forward speed ratio is determined by the ring gear/sun gear tooth ratios of the planetary gearsets 630 and 640. The numerical value of the second forward speed ratio is determined by the ring gear/sun gear tooth ratio of the planetary gearset 630. The numerical value of the third forward speed ratio is one. The numerical value of the sixth forward speed ratio is determined by the ring gear/sun gear tooth ratios of the planetary gearsets 620 and 630. The numerical value of the seventh forward speed ratio is determined by the ring gear/sun gear tooth ratio of the planetary gearset 620.

Figures 15, 16:
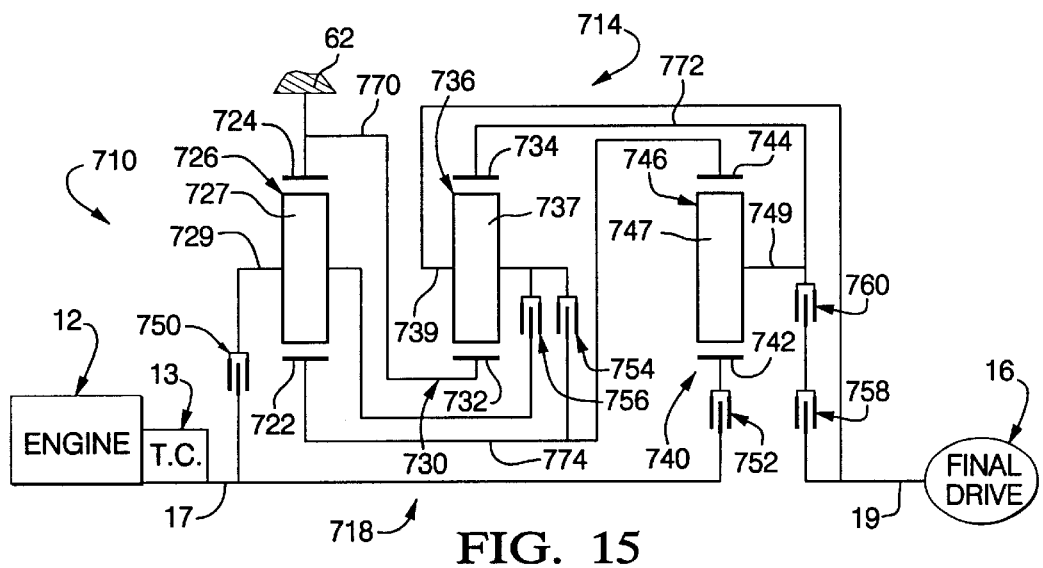
FIG. 15 is a schematic representation of a powertrain having a planetary transmission incorporating another embodiment of the present invention.
FIG. 16 is a truth table and chart providing some of the operating characteristics of the embodiment shown in FIG. 15.

A powertrain 710, shown in FIG. 15, includes the engine 12, the starting device 13, a planetary transmission 714, and the final drive mechanism 16. The planetary transmission 714 includes the input shaft 17, a planetary gear arrangement 718, and the output shaft 19. The planetary gear arrangement 718 includes three simple planetary gearsets 720, 730, and 740, and six rotating type torque-transmitting mechanisms 750, 752, 754, 756, 758, and 760.

The planetary gearset 720 includes a sun gear member 722, a ring gear member 724, and a planet carrier assembly member 726. The planet carrier assembly member 726 includes a plurality of pinion gear members 727 rotatably mounted on a planet carrier member 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gear members 737 rotatably mounted on a planet carrier member 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gear members 747 rotatably mounted on a planet carrier member 749 and disposed in meshing relationship with both the sun gear member 742 and the ring gear member 744.

The ring gear member 724 and sun gear member 732 are continuously interconnected by an interconnecting member 770, which is also continuously interconnected with the transmission housing 62. The ring gear member 734 and planet carrier assembly member 746 are continuously interconnected by an interconnecting member 772. The sun gear member 722 and ring gear member 744 are continuously interconnected by an interconnecting member 774. The output shaft 19 is continuously interconnected with the planet carrier assembly member 736.

The input shaft 17 is selectively interconnectible with the planet carrier assembly member 726 through the torque-transmitting mechanism 750, and selectively interconnectible with the sun gear member 742 through the torque-transmitting mechanism 752. The planet carrier assembly member 736 and therefore output shaft 19 are selectively interconnectible with the interconnecting member 774 through the torque-transmitting mechanism 754, and selectively interconnectible with the planet carrier assembly member 726 through the torque-transmitting mechanism 756. The sun gear member 742 is selectively connectible with the output shaft 19 through the torque-transmitting mechanism 758, and selectively interconnectible with the interconnecting member 772 through the torque-transmitting mechanism 760.

As can be seen in FIG. 16, the torque-transmitting mechanisms are selectively engaged in combinations of two to thereby establish seven forward speed ratios and one reverse speed ratio between the input shaft 17 and the output shaft 19. Also given in the truth table is a numerical example of the speed ratios that are available with the planetary gear arrangement 718 when the ring gear/sun gear tooth ratios of the planetary gearsets 720, 730, and 740 are as given in FIG. 16 as R1/S1, R2/S2, and R3/S3, respectively. FIG. 16 also has a chart providing numerical examples for the overall ratio spread of the forward speed ratios, the ratio steps between adjacent forward speed ratios, and the ratio step between the reverse and first forward speed ratio. These numerical values are, of course, determined from the example speed ratio values given in the truth table.

Those skilled in the art, upon reviewing the engagement combinations and the interconnections of the planetary gear arrangement 718, will be aware that the numerical value of the reverse speed ratio, the fourth forward speed ratio, and the fifth forward speed ratio are determined by the ring gear/sun gear tooth ratios of all three planetary gearsets 720, 730, and 740. The numerical value of the first forward speed ratio is determined by the ring gear/sun gear tooth ratios of the planetary gearsets 730 and 740. The numerical value of the second forward speed ratio is determined by the ring gear/sun gear tooth ratio of the planetary gearset 730. The numerical value of the third forward speed ratio is one. The numerical value of the sixth forward speed ratio is determined by the ring gear/sun gear tooth ratios of the planetary gearsets 720 and 730. The numerical value of the seventh forward speed ratio is determined by the ring gear/sun gear tooth ratio of the planetary gearset 720.

Figures 17, 18:
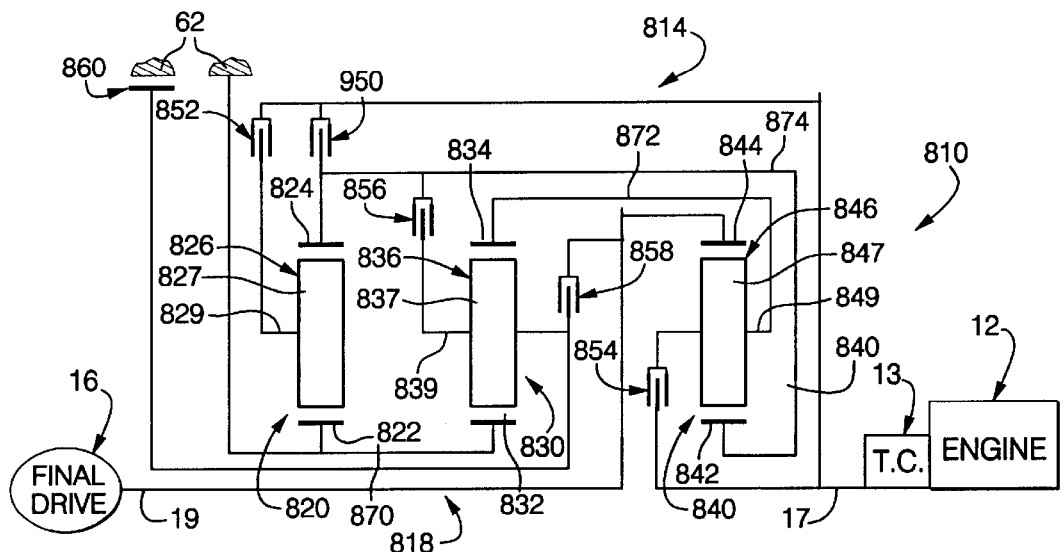
FIG. 17 is a schematic representation of a powertrain having a planetary transmission incorporating another embodiment of the present invention.
FIG. 18 is a truth table and chart providing some of the operating characteristics of the embodiment shown in FIG. 17.

A powertrain 810, shown in FIG. 17, includes the engine 12, the starting device 13, a planetary transmission 814, and the final drive mechanism 16. The planetary transmission 814 includes the input shaft 17, a planetary gear arrangement 818, and the output shaft 19. The planetary gear arrangement 818 includes three simple planetary gearsets 820, 830, and 840, five rotating type torque-transmitting mechanisms 850, 852, 854, 856, and 858, and one stationary type torque-transmitting mechanism 860.

The planetary gearset 820 includes a sun gear member 822, a ring gear member 824, and a planet carrier assembly member 826. The planet carrier assembly member 826 includes a plurality of pinion gear members 827 rotatably mounted on a planet carrier member 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gear members 837 rotatably mounted on a planet carrier member 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gear members 847 rotatably mounted on a planet carrier member 849 and disposed in meshing relationship with both the sun gear member 842 and the ring gear member 844.

The sun gear member 822 and sun gear member 832 are continuously interconnected by an interconnecting member 870, which is also continuously interconnected with the transmission housing 62. The ring gear member 834 and planet carrier assembly member 846 are continuously interconnected by an interconnecting member 872. The ring gear member 824 and sun gear member 842 are continuously interconnected by an interconnecting member 874. The output shaft 19 is continuously interconnected with the ring gear member 844.

The input shaft 17 is selectively interconnectible with the interconnecting member 874 through the torque-transmitting mechanism 850, selectively interconnectible with the planet carrier assembly member 826 through the torque-transmitting mechanism 852, and selectively interconnectible with the interconnecting member 872 through the torque-transmitting mechanism 854. The planet carrier assembly member 836 is selectively interconnectible with the interconnecting member 874 through the torque-transmitting mechanism 856, selectively interconnectible with the output shaft 19 through the torque-transmitting mechanism 858, and selectively interconnectible with the transmission housing 62 through the torque-transmitting mechanism 860.

The torque-transmitting mechanisms are selectively engaged in combinations of two, as shown in the truth table of FIG. 18, to establish eight forward speed ratios and one reverse speed ratio between the input shaft 17 and the output shaft 19. Also provided in the truth table is a numerical example of the eight forward speed ratios as well as the reverse speed ratio as can be obtained with the planetary gear arrangement 818 when the ring gear/sun gear tooth ratios of the planetary gearsets 820, 830, and 840 are as given in FIG. 18 as R1/S1, R2/S2, and R3/S3, respectively. Also provided in FIG. 18 is a chart showing the numerical value for the overall ratio spread of the forward speed ratios, the ratio steps between adjacent forward speed ratios, and the ratio step between the reverse and first forward speed ratio. These numerical values are, of course, determined from the speed ratio values given in the truth table.

Upon reviewing the engagement combinations for the torque-transmitting mechanisms and the interconnections within the planetary gear arrangement 818, those skilled in the art will recognize that the reverse speed ratio is determined by the ring gear/sun gear tooth ratio of the planetary gearset 840. The numerical value of the first forward speed ratio, the sixth forward speed ratio, and the seventh forward speed ratio are determined by the ring gear/sun gear tooth ratios of the planetary gearsets 830 and 840. The numerical value of the second forward speed ratio and the eighth forward speed ratio are determined by the ring gear/sun gear tooth ratios of all three planetary gearsets 820, 830, and 840. The numerical value of the third forward speed ratio is determined by the ring gear/sun gear tooth ratio of the planetary gearset 830. The numerical value of the fourth forward speed ratio is determined by the ring gear/sun gear tooth ratios of the planetary gearsets 820 and 840. The numerical value of the fifth forward speed ratio is one.

Figures 19, 20:
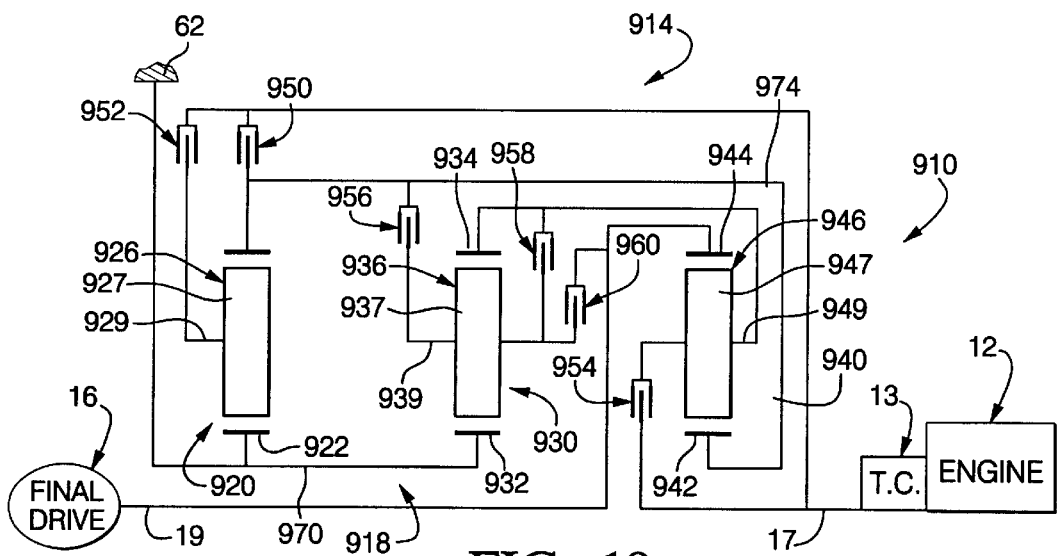
FIG. 19 is a schematic representation of a powertrain having a planetary transmission incorporating another embodiment of the present invention.
FIG. 20 is a truth table and chart providing some of the operating characteristics of the embodiment shown in FIG. 19.

A powertrain 910, shown in FIG. 19, includes the engine 12, the starting device 13, a planetary transmission 914, and the final drive mechanism 16. The planetary transmission 914 includes the input shaft 17, a planetary gear arrangement 918, and the output shaft 19. The planetary gear arrangement 918 includes three simple planetary gearsets 920, 930, and 940, and six rotating type torque-transmitting mechanisms 950, 952, 954, 956, 958, and 960.

The planetary gearset 920 includes a sun gear member 922, a ring gear member 924, and a planet carrier assembly member 926. The planet carrier assembly member 926 includes a plurality of pinion gear members 927 rotatably mounted on a planet carrier member 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gear members 937 rotatably mounted on a planet carrier member 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gear members 947 rotatably mounted on a planet carrier member 949 and disposed in meshing relationship with both the sun gear member 942 and the ring gear member 944.

The sun gear members 922 and 932 are continuously interconnected by an interconnecting member 970, which is continuously interconnected with the transmission housing 62. The ring gear member 934 and planet carrier assembly member 946 are continuously interconnected by an interconnecting member 972. The ring gear member 924 and sun gear member 942 are continuously interconnected by an interconnecting member 974. The output shaft 19 is continuously interconnected with the ring gear member 944.

The input shaft 17 is selectively interconnectible with the interconnecting member 974 through the torque-transmitting mechanism 950, selectively interconnectible with the planet carrier assembly member 926 through the torque-transmitting mechanism 952, and selectively interconnectible with the interconnecting member 972 through the torque-transmitting mechanism 954. The planet carrier assembly member 936 is selectively interconnectible with the interconnecting member 974 through the torque-transmitting mechanism 956, selectively interconnectible with the interconnecting member 972 through the torque-transmitting mechanism 958, and selectively interconnectible with the output shaft 19 through the torque-transmitting mechanism 960.

The torque-transmitting mechanisms are selectively engaged in combinations of two, as shown in the truth table of FIG. 20, to establish a reverse speed ratio and eight forward speed ratios between the input shaft 17 and the output shaft 19. Also provided in the truth table is a numerical example of the speed ratios that are available in the planetary gear arrangement 918 when the ring gear/sun gear tooth ratios of the planetary gearsets 920, 930, and 940 are given as R1/S1, R2/S2, and R3/S3, respectively. Also seen in FIG. 20 is a chart providing a numerical value for the overall ratio spread of the forward speed ratios, the ratio steps between adjacent forward speed ratios, and the ratio step between the reverse and first forward speed ratio. These numerical values are, of course, determined from the speed ratio values given in the truth table.

Those skilled in the art, upon reviewing the engagement combinations of the truth table as well as the interconnections within the planetary gear arrangement 918, will be aware that the numerical value of the reverse speed ratio is determined by the ring gear/sun gear tooth ratio of the planetary gearset 940. The numerical value of the first forward speed ratio, the sixth forward speed ratio, and the seventh forward speed ratio are determined by the ring gear/sun gear tooth ratios of the planetary gearsets 930 and 940. The numerical value of the second forward speed ratio and the eighth forward speed ratio are determined by the ring gear/sun gear tooth ratios of all three planetary gearsets 920, 930, and 940. The numerical value of the third forward speed ratio is determined by the ring gear/sun gear tooth ratio of the planetary gearset 930. The numerical value of the fourth forward speed ratio is determined by the ring gear/sun gear tooth ratios of the planetary gearsets 920 and 940. The numerical value of the fifth forward speed ratio is one.

Figures 21, 22:
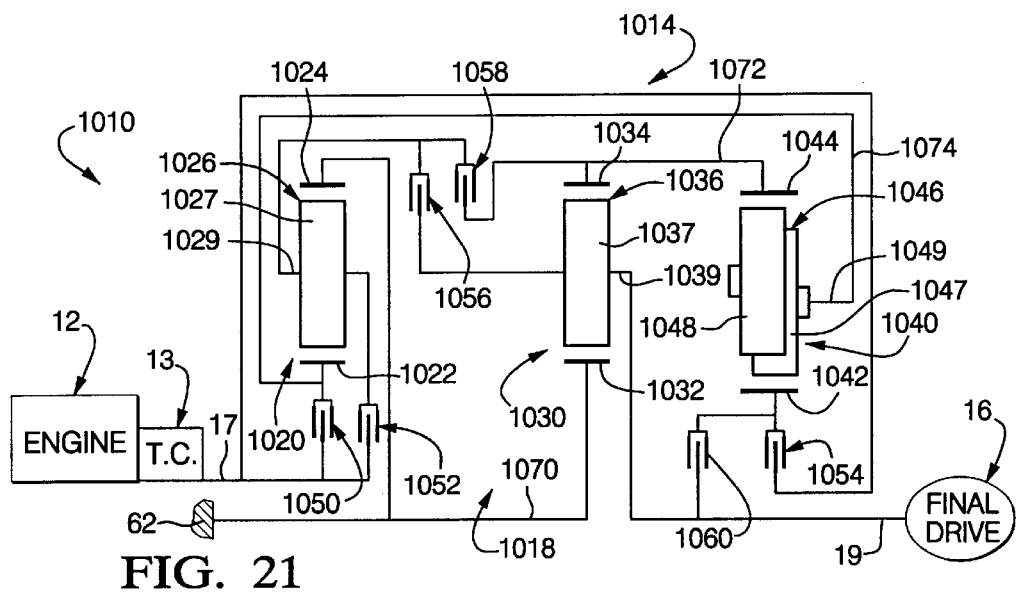
FIG. 21 is a schematic representation of a powertrain having a planetary transmission incorporating another embodiment of the present invention.
FIG. 22 is a truth table and chart providing some of the operating characteristics of the embodiment shown in FIG. 21.

A powertrain 1010, shown in FIG. 21, includes the engine 12, the starting device 13, a planetary transmission 1014, and the final drive mechanism 16. The planetary transmission 1014 includes the input shaft 17, a planetary gear arrangement 1018, and the output shaft 19. The planetary gear arrangement 1018 includes two simple planetary gearsets 1020 and 1030, a compound planetary gearset 1040, and six rotating type torque-transmitting mechanisms 1050, 1052, 1054, 1056, 1058, and 1060.

The planetary gearset 1020 includes a sun gear member 1022, a ring gear member 1024, and a planet carrier assembly member 1026. The planet carrier assembly member 1026 includes a plurality of pinion gear members 1027 rotatably mounted on a planet carrier member 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gear members 1037 rotatably mounted on a planet carrier member 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of intermeshing pinion gear members 1047 and 1048, which are rotatably mounted on a planet carrier member 1049 and disposed in meshing relationship with the sun gear member 1042 and the ring gear member 1044, respectively.

The ring gear member 1024 and sun gear member 1032 are continuously interconnected by an interconnecting member 1070, which is continuously interconnected with the transmission housing 62. The ring gear member 1034 and ring gear member 1044 are continuously interconnected by an interconnecting member 1072. The sun gear member 1022 and planet carrier assembly member 1046 are continuously interconnected by an interconnecting member 1074. The output shaft 19 is continuously interconnected with the planet carrier assembly member 1036.

The input shaft 17 is selectively interconnectible with the interconnecting member 1074 through the torque-transmitting mechanism 1050, selectively interconnectible with the planet carrier assembly member 1026 through the torque-transmitting mechanism 1052, and selectively interconnectible with the sun gear member 1042 through the torque-transmitting mechanism 1054. The planet carrier assembly member 1036 and therefore output shaft 19 are selectively interconnectible with the planet carrier assembly member 1026 through the torque-transmitting mechanism 1056, and selectively interconnectible with the sun gear member 1042 through the torque-transmitting mechanism 1060. The planet carrier assembly member 1026 is selectively interconnectible with the interconnecting member 1072 through the torque-transmitting mechanism 1058.

As seen in the truth table of FIG. 22, the torque-transmitting mechanisms are selectively engaged in combinations of two to establish seven forward speed ratios and one reverse speed ratio between the input shaft 17 and the output shaft 19. Also given in the truth table is a numerical example for speed ratios that are available with the planetary transmission 1014 when the ring gear/sun gear tooth ratios of the planetary gearsets 1020, 1030, and 1040 are as shown in FIG. 22 as R1/S1, R2/S2, and R3/S3, respectively. Also given in FIG. 22 is a chart providing the numerical values for the overall ratio spread of the forward speed ratios, the ratio steps between adjacent forward speed ratios, and the ratio step between the reverse and first forward speed ratio. These numerical values are, of course, determined from the speed ratios given in the truth table.

Those skilled in the art, upon reviewing the engagement combinations and the interconnections within the planetary gear arrangement 1018, will recognize that the numerical value of the reverse speed ratio, the sixth forward speed ratio, and the seventh forward speed ratio are determined by the ring gear/sun gear tooth ratios of all three planetary gearsets 1020, 1030, and 1040. The numerical value of the first forward speed ratio is determined by the ring gear/sun gear tooth ratios of the planetary gearsets 1020 and 1030. The numerical value of the second forward speed ratio is determined by the ring gear/sun gear tooth ratio of the planetary gearset 1020. The numerical value of the third forward speed ratio is determined by the ring gear/sun gear tooth ratios of the planetary gearsets 1030 and 1040. The numerical value of the fourth forward speed ratio is determined by the ring gear/sun gear tooth ratio of the planetary gearset 1030. The numerical value of the fifth forward speed ratio is one.

Figures 23, 24:
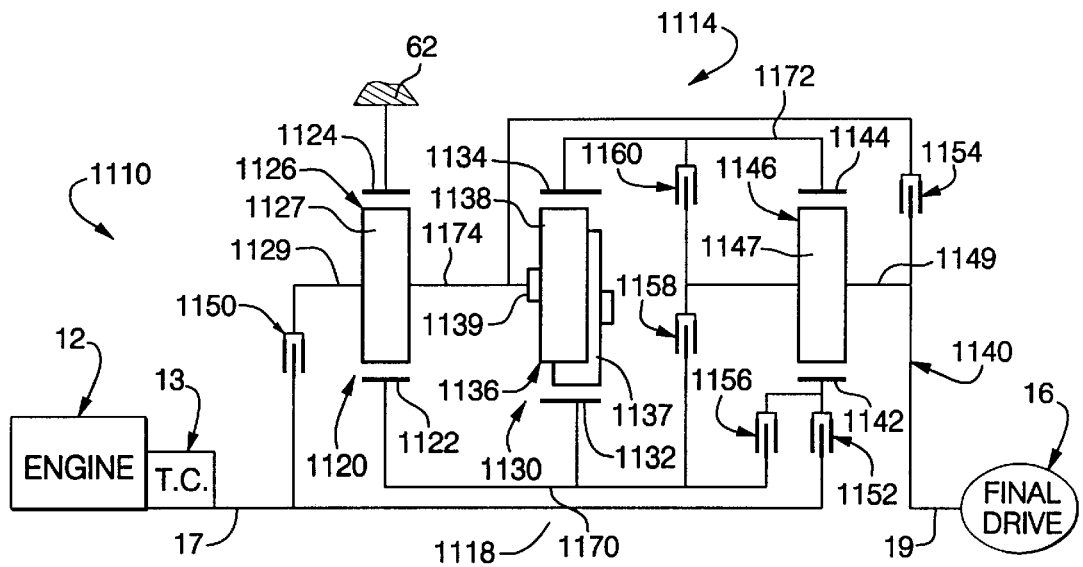
FIG. 23 is a schematic representation of a powertrain having a planetary transmission incorporating another embodiment of the present invention.
FIG. 24 is a truth table and chart providing some of the operating characteristics of the embodiment shown in FIG. 23.

A powertrain 1110, shown in FIG. 23, includes the engine 12, the starting device 13, a planetary transmission 1114, and the final drive mechanism 16. The planetary transmission 1114 includes the input shaft 17, a planetary gear arrangement 1118, and the output shaft 19. The planetary gear arrangement 1118 includes a simple planetary gearset 1120, a compound planetary gearset 1130, a simple planetary gearset 1140, and six rotating type torque-transmitting mechanisms 1150, 1152, 1154, 1156, 1158, and 1160.

The planetary gearset 1120 includes a sun gear member 1122, a ring gear member 1124, and a planet carrier assembly member 1126. The planet carrier assembly member 1126 includes a plurality of pinion gear members 1127 rotatably mounted on a planet carrier member 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of intermeshing pinion gear members 1137 and 1138, which are rotatably mounted on a planet carrier member 1139 and disposed in meshing relationship with the sun gear member 1132 and the ring gear member 1134, respectively.

The planetary gearset 1140 includes a sun gear member 1142, a ring gear member 1144, and a planet carrier assembly member 1146. The planet carrier assembly member 1146 includes a plurality of pinion gear members 1147 rotatably mounted on a planet carrier member 1149 and disposed in meshing relationship with both the sun gear member 1142 and the ring gear member 1144.

The sun gear member 1122 and sun gear member 1132 are continuously interconnected by an interconnecting member 1170. The ring gear members 1134 and 1144 are continuously interconnected by an interconnecting member 1172. The planet carrier assembly member 1126 and planet carrier assembly member 1136 are continuously interconnected by an interconnecting member 1174. The output shaft 19 is continuously interconnected with the planet carrier assembly member 1146. The ring gear member 1124 is continuously interconnected with the transmission housing 62.

The input shaft 17 is selectively interconnectible with the interconnecting member 1174 through the torque-transmitting mechanism 1150, and selectively interconnectible with the sun gear member 1142 through the torque-transmitting mechanism 1152. The interconnecting member 1174 is selectively interconnectible with the output shaft 19 through the torque-transmitting mechanism 1154. The sun gear member 1142 is selectively interconnectible with the interconnecting member 1170 through the torque-transmitting mechanism 1156. The planet carrier assembly member 1146 and therefore output shaft 19 are selectively interconnectible with the interconnecting member 1170 through the torque-transmitting mechanism 1158, and selectively interconnectible with the interconnecting member 1172 through the torque-transmitting mechanism 1160.

The torque-transmitting mechanisms are engaged in combinations of two, as shown in the truth table of FIG. 24. These combinations of engagements will permit the selection of seven forward speed ratios and one reverse speed ratio between the input shaft 17 and the output shaft 19. Also given in the truth table is an example of numerical values for the seven forward speed ratios and the reverse speed ratio when the ring gear/sun gear tooth ratios of the planetary gearsets 1120, 1130, and 1140 are given as R1/S1, R2/S2, and R3/S3, respectively. FIG. 24 also includes a chart providing the numerical values for the overall ratio spread of the forward speed ratios, the ratio steps between adjacent forward speed ratios, and the ratio step between the reverse and first forward speed ratio. These numerical values are, of course, determined from the numerical values of the speed ratios given in the truth table.

Those skilled in the art will recognize that the engagement combinations and the connections made within the planetary gear arrangement 1118 will result in the numerical values of the reverse speed ratio, the first forward speed ratio, the second forward speed ratio, the fourth forward speed ratio, and the sixth forward speed ratio determined by the ring gear/sun gear tooth ratios of all three planetary gearsets 1120, 1130, and 1140. The numerical value of the third forward speed ratio is one. The numerical value of the fifth forward speed ratio is determined by the ring gear/sun gear tooth ratios of the planetary gearsets 1120 and 1130. The numerical value of the seventh forward speed ratio is determined by the ring gear/sun gear tooth ratio of the planetary gearset 1120.

It should now be apparent from the above descriptions of the embodiments shown that the transmission family members each have three planetary gearsets, which each has three members; namely, a sun gear member, a ring gear member, and a planet carrier assembly member. It is also apparent from the above descriptions that the first members of the first and second planetary gearsets are continuously interconnected, the second member of the second planetary gearset and the first member of the third planetary gearset are continuously interconnected, and the second member of the first planetary gearset and either the third member of the second planetary gearset or the second member of the third planetary gearset are continuously interconnected. The output shaft 19 of the transmission is continuously connected with at least one planetary gear member, and at least one planetary gear member is continuously interconnected with the transmission housing.

There are six torque-transmitting mechanisms in each family member, at least two of which provide interconnections between the input shaft of the transmission and one or more planetary gear members. These six torque-transmitting mechanisms are selectively engaged in combinations of two to establish at least seven forward speed ratios and one reverse speed ratio between the transmission input shaft and the transmission output shaft.

What is claimed is:

1. A transmission comprising:
    an input shaft;
    an output shaft;
    a transmission housing;
    a first planetary gearset having a first member, a second member, and a third member;
    a second planetary gearset having a first member, a second member, and a third member;
    a third planetary gearset having a first member, a second member, and a third member;
    a first interconnecting member continuously interconnecting said first member of said first planetary gearset with said first member of said second planetary gearset;
    a second interconnecting member continuously interconnecting said second member of said second planetary gearset with said first member of said third planetary gearset;
    a third interconnecting member continuously interconnecting said second member of said first planetary gearset with either said third member of said second planetary gearset, or said second member of said third planetary gearset;
    a member of said first planetary gearset being continuously interconnected with a stationary transmission housing;
    said output shaft being continuously interconnected with at least one member of one of said planetary gearsets;
    said input shaft being non-continuously interconnected with members of the planetary gearsets;
    six torque-transmitting mechanisms selectively connecting members of said planetary gearsets with said input shaft, said output shaft, said transmission housing or other members of said planetary gearsets, and being selectively engageable in combinations of two to establish at least seven forward speed ratios and one reverse speed ratio between said input shaft and said output shaft; and
    at least two of said torque-transmitting mechanisms being operable to provide selective connections between said input shaft and at least one member of one of said planetary gearsets.

2. The transmission defined in claim 1 further comprising:
    said output shaft being connected with said second member of said third planetary gearset, said third interconnecting member interconnecting said second member of said first planetary gearset and said third member of said second planetary gearset, said housing being connected with said third member of said first planetary gearset, or
    said output shaft being connected with said third member of said second planetary gearset, said housing being connected with said first interconnecting member, and said third interconnecting member interconnecting said second member of said first planetary gearset with said second member of said third planetary gearset, or
    said output shaft being connected with said third member of said third planetary gearset, said output shaft being connected with said first interconnecting member, and said third interconnecting member interconnecting said second member of said first planetary gearset with said second member of said third planetary gearset.

3. The transmission defined in claim 2 further comprising:
    each of said first members of said first, second, and third planetary, gearsets being either a sun gear member, a ring gear member, or a planet carrier assembly member;
    each of said second members of said first, second, and third planetary gearsets being either a sun gear member, a ring gear member, or a planet carrier assembly member; and
    each of said third member of said first, second, and third planetary gearsets being either a sun gear member, a ring gear member, or a planet carrier assembly member.

4. A transmissions comprising:
    an input shaft;
    an output shaft;
    a transmission housing;

a first planetary gearset having a first member, a second member, and a third member;

a second planetary gearset having a first member, a second member, and a third member;

a third planetary gearset having a first member, a second member, and a third member;

a first interconnecting member continuously interconnecting said first member of said first planetary gearset with said first member of said second planetary gearset;

a second interconnecting member continuously interconnecting said second member of said second planetary gearset with said first member of said third planetary gearset;

a third interconnecting member continuously interconnecting said second member of said first planetary gearset with a member of a group consisting of said third member of said second planetary gearset and said second member of said third planetary gearset;

a member of a group consisting of said third member of said first planetary gearset and said first interconnecting member being continuously interconnected with said transmission housing;

said output shaft being continuously interconnected with a member of group consisting of said third member of said second planetary gearset, said second member of said third planetary gearset, and said third member of said third planetary gearset;

six torque transmitting mechanisms that are selectively operable in combinations of two to establish at least seven forward speed ratios and one reverse speed ratio between said input shaft and said output shaft, wherein:

a first of said torque transmitting mechanisms selectively interconnecting said input shaft with said third interconnecting member, a second of said torque transmitting mechanisms selectively interconnecting said input shaft with said second interconnecting member, a third of said torque transmitting mechanisms selectively interconnecting said input shaft with said third member of said third planetary gearset, a fourth of said torque transmitting mechanisms selectively interconnecting said third interconnecting member with said output shaft, a fifth of said torque transmitting mechanisms selectively interconnecting said first interconnecting member with said third member of said third planetary gearset and a sixth of said torque transmitting mechanisms selectively interconnecting said housing with said third interconnecting member, or said first, second, and third torque transmitting mechanisms selectively interconnecting said input shaft with said third interconnecting member, said second interconnecting member, and said third member of said third planetary gearset, respectively, said fourth torque transmitting mechanism selectively interconnecting said third interconnecting member with said output shaft, said fifth torque-transmitting mechanism selectively interconnecting said first interconnecting member with said second interconnecting member, and said sixth torque-transmitting mechanism selectively interconnecting said first interconnecting member with said third member of said third planetary gearset, or said first and second torque-transmitting mechanisms selectively interconnecting said input shaft with said third interconnecting member and said third member of said third planetary gearset, respectively, said third torque-transmitting mechanism selectively interconnecting said third interconnecting member with said output shaft, said fourth torque-transmitting mechanism selectively interconnecting said first interconnecting member with said third member of said third planetary gearset, said fifth torque-transmitting mechanism selectively interconnecting said first interconnecting member with said second member of said third planetary gearset, and said sixth torque-transmitting mechanism selectively interconnecting said third member of said third planetary gearset with said output shaft, or said first and second torque transmitting mechanisms selectively interconnecting said input shaft with said third member of said first planetary gearset and third member of said third planetary gearset respectively, said third torque-transmitting mechanism selectively interconnecting said third interconnecting member with said output shaft, said fourth torque-transmitting mechanism selectively interconnecting said second interconnecting member with said third interconnecting member, said fifth torque-transmitting mechanism selectively interconnecting said second interconnecting member with said third member of said first planetary gearset, and said sixth torque-transmitting mechanism selectively interconnecting said third member of said third planetary gearset with said output shaft, or said first and second torque transmitting mechanisms selectively interconnecting said input shaft with said third member of said first planetary gearset and third member of said third planetary gearset respectively said third torque-transmitting mechanism selectively interconnecting said second interconnecting member with said output shaft, said fourth torque-transmitting mechanism, selectively interconnecting said third member of said first planetary gearset with said third member of said third planetary gearset, said fifth torque-transmitting mechanism selectively interconnecting said third member of said third planetary gearset with said output shaft, and said sixth torque-transmitting mechanism selectively interconnecting said third member of said third planetary gearset with said second interconnecting member, or said first and second torque transmitting mechanisms selectively interconnecting said input shaft with said third member of said first planetary gearset and third member of said third planetary gearset respectively, said third torque-transmitting mechanism selectively interconnecting said third interconnecting member with said output shaft, said fourth torque-transmitting mechanism selectively interconnecting said second interconnecting member with said third interconnecting member, said fifth torque-transmitting mechanism selectively interconnecting said third member of said first planetary gearset with said output shaft, and said sixth torque-transmitting mechanism selectively interconnecting said third member of said third planetary gearset with said output shaft, or said first and second torque transmitting mechanisms selectively interconnecting said input shaft with said third member of said first planetary gearset and third member of said third planetary gearset respectively, said third torque-transmitting mechanism selectively interconnecting said third interconnecting member with said output shaft, said fourth torque-transmitting mechanism selectively interconnecting said third interconnecting member with said third member of said third planetary gearset, said fifth torque-transmitting mechanism selectively interconnecting said third member of said first planetary gearset with said output shaft, and said sixth torque-transmitting mechanism selectively interconnecting said third member of said third planetary gearset with said output shaft, or said first and second torque transmitting mechanisms selectively interconnecting said input shaft with said third member of said first planetary gearset and third member of said third planetary gearset respectively, said third torque-transmitting mechanism selectively interconnecting said third interconnecting member with said output shaft, said fourth torque-transmitting mechanism selectively interconnecting said third member of said first planetary gearset with said output shaft, said fifth torque-transmitting mechanism selectively interconnecting said third member of said third planetary gearset with said output shaft, and said sixth torque-transmitting mechanism selectively interconnecting said second interconnecting member with said third member of said third planetary gearset, or said first, second, and third torque-transmitting mechanisms selectively interconnecting said input shaft with said third interconnecting member, said third member of said first planetary gearset, and said second interconnecting member, respectively, said fourth torque-transmitting mechanism selectively interconnecting said third member of said second planetary gearset with said third interconnecting member, said fifth torque-transmitting mechanism selectively interconnecting said third member of said second planetary gearset with said output shaft, and said sixth torque-transmitting mechanism selectively interconnecting said housing with said third member of said second planetary gearset, or said first, second, and third torque-transmitting mechanisms selectively interconnecting said input shaft with said third interconnecting member, said third member of said first planetary gearset, and said second interconnecting member, respectively, said fourth torque-transmitting mechanism selectively interconnecting said third interconnecting member with said third member of said second planetary gearset, said fifth torque-transmitting mechanism selectively interconnecting said second interconnecting member with said third member of said second planetary gearset, and said sixth torque-transmitting mechanism selectively interconnecting said third member of said second planetary gearset with said output shaft, or said first, second, and third torque-transmitting mechanisms selectively interconnecting said input shaft with said third interconnecting member, said third member of said first planetary gearset, and said third member of said third planetary gearset, respectively, said fourth torque-transmitting mechanism selectively interconnecting said third member of said first planetary gearset with said output shaft, said fifth torque-transmitting mechanism selectively interconnecting said second interconnecting member with said third member of said first planetary gearset, and said sixth torque-transmitting mechanism selectively interconnecting said third member of said third planetary gearset with said output shaft, or said first and second torque transmitting mechanisms selectively interconnecting said input shaft with said third interconnecting, member and said third member of said third planetary gearset, respectively, said third torque-transmitting mechanism selectively interconnecting said third interconnecting member with said output shaft, said fourth torque-transmitting mechanism selectively interconnecting said first interconnecting member with said third member of said third planetary gearset, said fifth torque-transmitting mechanism selectively interconnecting said first interconnecting member with said output shaft, and said sixth torque-transmitting mechanism selectively interconnecting said second interconnecting member with said output shaft.

5. The transmission defined in claim 4 further comprising:

each of said first members of said first, second, and third planetary gearsets being selected from a first group consisting of a sun gear member, a ring gear member, and a planet carrier assembly member;

each of said second members of said first, second, and third planetary gearsets being selected from a second group consisting a sun gear member, a ring gear member, and a planet carrier assembly member that is not selected as said first member of each respective planetary gearset; and each of said third members of said first, second, and third planetary gearsets being selected from a third group consisting of a sun gear member, a ring gear member, and a planet carrier assembly member that is not selected as one of said first member and said second member of each respective planetary gearset.

* * * * *